United States Patent
Zhang

(10) Patent No.: US 10,823,047 B2
(45) Date of Patent: Nov. 3, 2020

(54) EXHAUST CONTROL VALVE CONTROLLING EXHAUST GAS FLOW IN A TURBOCHARGER SYSTEM

(71) Applicant: Ford Global Technologies, LLC, Dearborn, MI (US)

(72) Inventor: Xiaogang Zhang, Novi, MI (US)

(73) Assignee: Ford Global Technologies, LLC, Dearborn, MI (US)

(*) Notice: Subject to any disclaimer, the term of this patent is extended or adjusted under 35 U.S.C. 154(b) by 70 days.

(21) Appl. No.: 16/172,201

(22) Filed: Oct. 26, 2018

(65) Prior Publication Data

US 2019/0063306 A1    Feb. 28, 2019

Related U.S. Application Data

(62) Division of application No. 14/806,324, filed on Jul. 22, 2015, now Pat. No. 10,151,236.

(51) Int. Cl.
| | |
|---|---|
| *F02B 37/007* | (2006.01) |
| *F02B 37/18* | (2006.01) |
| *F02D 41/00* | (2006.01) |
| *F02M 26/08* | (2016.01) |
| *F02M 26/53* | (2016.01) |

(52) U.S. Cl.
CPC .......... *F02B 37/007* (2013.01); *F02B 37/183* (2013.01); *F02D 41/0007* (2013.01); *F02D 41/0085* (2013.01); *F02M 26/08* (2016.02); *F02M 26/53* (2016.02);
(Continued)

(58) Field of Classification Search
CPC .... F02B 37/001; F02B 37/002; F02B 37/007; F02B 37/02; F02B 37/025; F02B 37/14; F02B 37/18–186; Y02T 10/144
See application file for complete search history.

(56) References Cited

U.S. PATENT DOCUMENTS

| | | | | |
|---|---|---|---|---|
| 3,423,926 | A * | 1/1969 | Holzhausen | .......... F02B 37/025 60/615 |
| 3,557,549 | A * | 1/1971 | Webster | ................ F01D 17/148 60/602 |

(Continued)

FOREIGN PATENT DOCUMENTS

| | | |
|---|---|---|
| CN | 102297014 A | 12/2011 |
| CN | 102421999 A | 4/2012 |

(Continued)

OTHER PUBLICATIONS

National Intellectual Property Administration of the People's Republic of China, Office Action and Search Report Issued in Application No. 201610578402.9, dated Aug. 22, 2019, 15 pages. (Submitted with Partial Translation).

*Primary Examiner* — Laert Dounis
(74) *Attorney, Agent, or Firm* — Geoffrey Brumbaugh; McCoy Russell LLP

(57) ABSTRACT

Methods and systems for adjusting a branch communication valve in a dual scroll turbocharger system are provided. In one example, a method may include adjusting a position of a valve arranged between a first adaptor and a second adaptor to enable mixing of exhaust received from an exhaust manifold, the exhaust delivered to a first scroll and a second scroll of a turbocharger to drive a turbine during certain engine operating conditions.

9 Claims, 7 Drawing Sheets

(52) U.S. Cl.
CPC .......... *F02D 2200/0406* (2013.01); *F02D 2200/101* (2013.01); *Y02T 10/144* (2013.01)

(56) References Cited

U.S. PATENT DOCUMENTS

| | | | |
|---|---|---|---|
| 4,008,572 A | | 2/1977 | Woollenweber, Jr. |
| 4,169,354 A | | 10/1979 | Woollenweber |
| 4,395,884 A | | 8/1983 | Price |
| 4,506,703 A | * | 3/1985 | Baron ............... B08B 9/0323 137/625.43 |
| 6,073,447 A | * | 6/2000 | Kawakami ............ F01D 9/026 60/602 |
| 6,381,960 B1 | | 5/2002 | Mårdberg |
| 9,068,501 B2 | | 6/2015 | Styles et al. |
| 9,810,143 B2 | | 11/2017 | McConville et al. |
| 2003/0074899 A1 | | 4/2003 | Yamaguchi et al. |
| 2008/0000460 A1 | | 1/2008 | Hertweck et al. |
| 2009/0171550 A1 | | 7/2009 | Teraya |
| 2011/0302917 A1 | | 12/2011 | Styles et al. |
| 2012/0060494 A1 | * | 3/2012 | Sato ................. F02B 37/025 60/602 |
| 2013/0014502 A1 | * | 1/2013 | Sato ................. F02B 37/20 60/602 |
| 2014/0219849 A1 | | 8/2014 | Styles et al. |
| 2015/0013330 A1 | | 1/2015 | Kindl et al. |

FOREIGN PATENT DOCUMENTS

| | | |
|---|---|---|
| CN | 104100346 A | 10/2014 |
| CN | 204024804 U | 12/2014 |

* cited by examiner

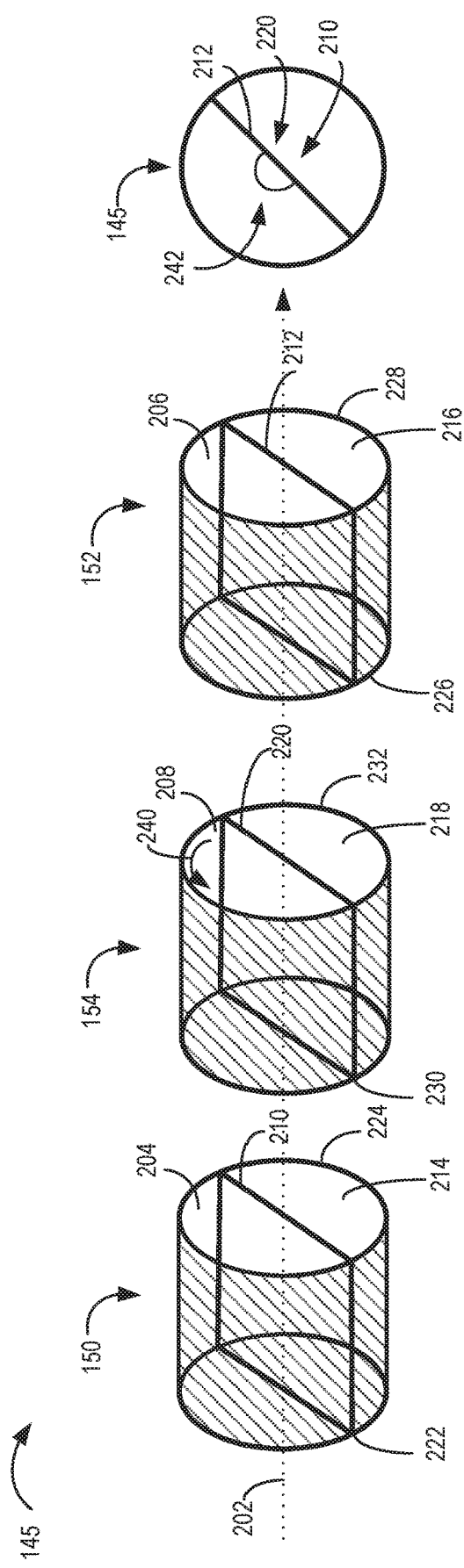
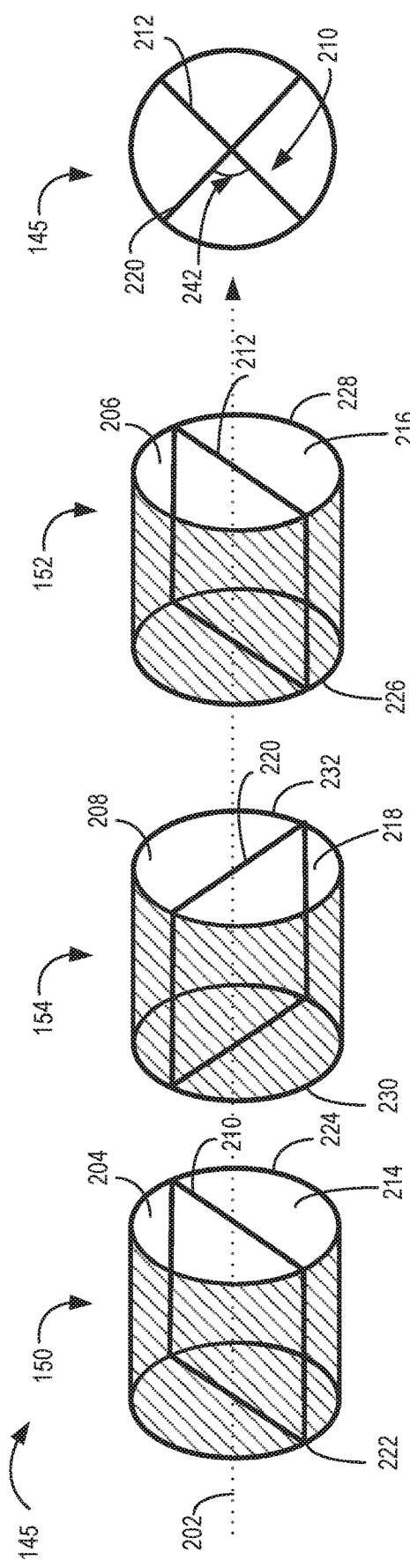
FIG. 2A
FIG. 2B
FIG. 2C
FIG. 2D

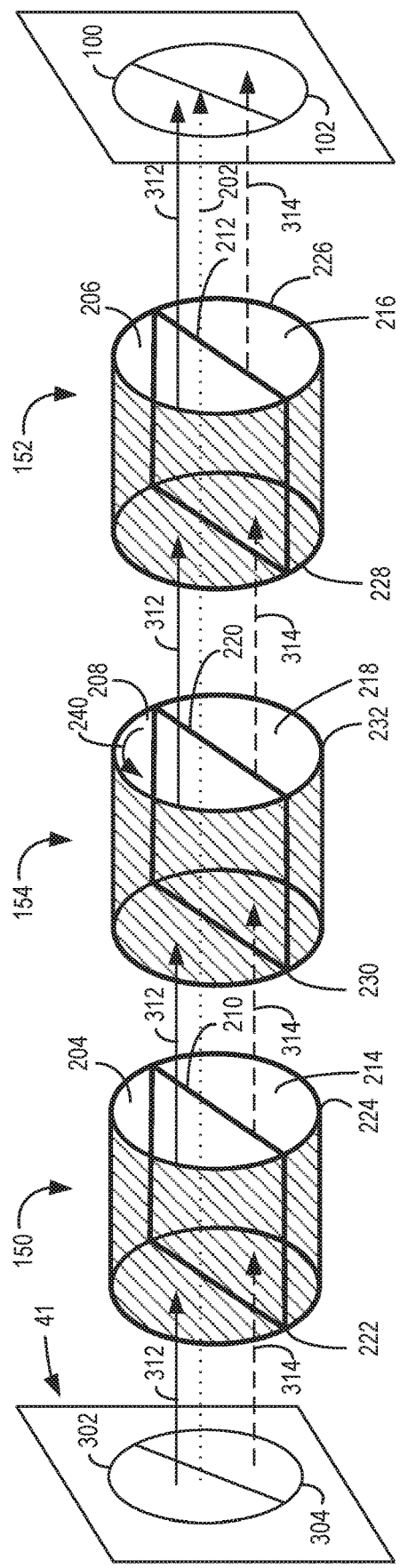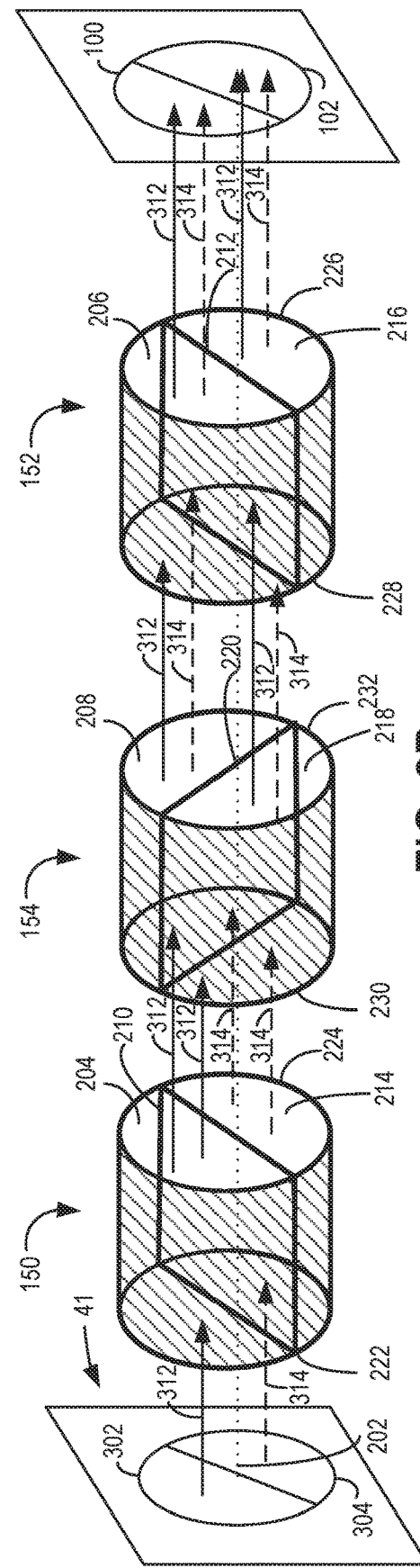
FIG. 3A
FIG. 3B

EXHAUST CONTROL VALVE CONTROLLING EXHAUST GAS FLOW IN A TURBOCHARGER SYSTEM

CROSS REFERENCE TO RELATED APPLICATION

The present application is a divisional of U.S. patent application Ser. No. 14/806,324, entitled "Exhaust Control Valve Controlling Exhaust Gas Flow in a Turbocharger System," filed on Jul. 22, 2015. The entire contents of the above-referenced application are hereby incorporated by reference in its entirety for all purposes.

FIELD

The present disclosure relates to a turbocharger of an engine.

BACKGROUND/SUMMARY

Twin, or dual, scroll turbocharger configurations may be used in turbocharged engines. A twin scroll turbocharger configuration may separate an inlet to a turbine into two separate passages connected to exhaust manifold runners. In this way, exhaust from the engine cylinders, whose exhaust gas pulses may interfere with each other, are fluidically separated.

For example, on an I4 engine with a cylinder firing order of exhaust manifold runners 1-3-4-2, exhaust manifold runners 1 and 4 may be connected to a first inlet of a twin scroll turbine and exhaust manifold runners 2 and 3 may be connected to a second inlet of said twin scroll turbine, where the second inlet is different and fluidically separated from the first inlet. In this way, separating exhaust gas pulses may result in an increase in efficiency of exhaust gas delivery to a turbine in some cases.

However, under some engine operating conditions, separating exhaust gas pulses as described above may reduce an efficiency of exhaust gas delivery to a turbine. For example, under certain engine operating conditions, e.g., high speed and high load conditions, separating exhaust gas pulses may result in an increase in backpressure and pumping work. This increase in backpressure and pumping work may be due to more restrictive, lower volume passages between the exhaust and the turbine in a dual scroll turbine, as compared to a passage that is not separated in a single scroll turbine. As such, the amount of exhaust gas in the cylinder may raise the pressure in the lower volume passages compared to the relatively larger volume, unseparated passage. The increased backpressure may also result in higher levels of residual gas having excessive temperatures in the cylinder, thereby reducing the engine's output power and engine efficiency.

One example approach for reducing backpressure and pumping work in a twin scroll turbocharger has been shown by Styles et al. in U.S. 2014/0219849. Herein, systems positioning a branch communication valve between a first scroll and a second scroll in a twin (e.g., dual) scroll turbocharger system are provided. In an example, a branch communication valve may be positioned in a passage within a wall separating a first scroll and a second scroll of the twin turbocharger. In an open position, the branch communication valve may increase fluid communication between the first and second scroll, and in a closed position, the branch communication valve may decrease fluid communication between the first and second scroll. The branch communication valve of Styles et al. comprises a valve plate rotatable about a hinge, the hinge positioned within a recess of the second scroll. The valve plate is movable between a first position, wherein the valve plate covers the opening in the dividing wall, and a second position, wherein the valve plate is within the recess.

The inventors herein have recognized a potential issue with the example approach of Styles et al. For example, there may be cost, weight, and packaging penalties associated with the above configuration of branch communication valve having a valve plate rotatable about a hinge in the turbocharger and engine system. For example, the hinge is shown in a recess of the second scroll, which increases the size and complexity of manufacturer of the turbocharger system. Further, the branch communication valve comprises a valve plate and valve stem, the valve plate slidable to cover the opening. As such, these components, such as the valve plate and valve stem, are exposed to high temperatures and, thus, may wear overtime. The components may also be an additional burden on an engine control and monitoring system when the aforementioned system is adjusted on engine operating conditions.

The inventors herein have identified an approach to at least partly address the above issue. In an example, a method for an engine is provided, comprising adjusting a position of a valve arranged between a first adaptor and a second adaptor to enable mixing of exhaust received from an exhaust manifold responsive to engine load and engine speed, the exhaust delivered to a first scroll and a second scroll of a turbocharger, wherein the first adaptor includes a first divider, the second adaptor includes a second divider, and the valve includes a third divider. In this way, there may be a reduction in flow restriction during certain engine operating conditions, such as high engine speed and/or high engine load.

In one example, the method may adjust a valve to provide one of a separation of exhaust and mixing of exhaust, wherein the valve varies a degree of mixing of exhaust received from an exhaust manifold. As such, each of the first adaptor and second adaptor may be stationary, while the valve may rotate about the central axis to selectively vary a degree of alignment of the third divider of the valve relative to the first divider of the first adaptor and the second divider of the second adaptor. In this way, the method may provide a straightforward and uncomplicated controls and systems for regulating pulsation flow to the turbocharger based on various engine operating conditions.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

FIGS. 2A-2D illustrate schematic views of an example branch communication valve in a first and a second position.

FIGS. 3A-3B show schematic views of an example branch communication valve in a first and a second position, and a flow of exhaust gas from an exhaust manifold, through a valve assembly, and into a first and second scroll.

DETAILED DESCRIPTION

Figure 1:
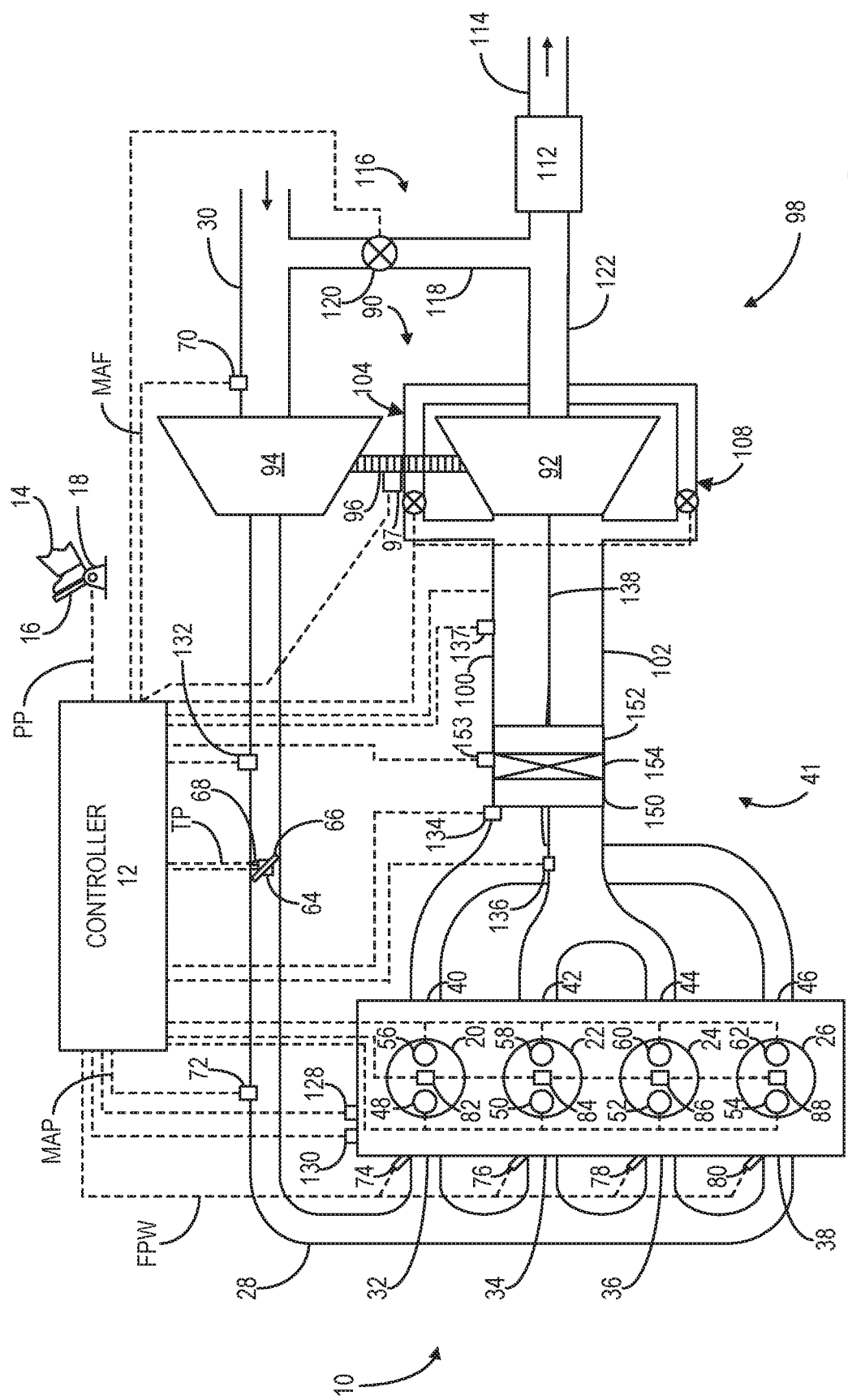
FIG. 1 shows a schematic diagram of an example engine including a dual (twin) scroll turbocharger and a branch communication valve.

The following description relates to systems and methods for controlling fluid communication between a first and second scroll in a dual (i.e. twin) scroll turbocharger system having a branch communication and wastegate valve in an engine system, such as the engine systems in FIG. 1. As shown in FIGS. 2A and 2B, in some embodiments, a branch communication valve may be provided, wherein the branch communication valve may be coupled to a first adaptor at a second end of the branch communication valve, and coupled to a second adaptor at a first end of the branch communication valve. The aforementioned system having the branch communication valve, the first adaptor, and the second adaptor, may control an increase and/or decrease in fluid communication between the first and second scrolls, and exhaust gas flow through the turbine. A position and/or orientation of the branch communication valve may be adjusted relative to a position and/or orientation of the first and second adaptors during various engine operating conditions. For example, adjusting the branch communication valves to a second position may allow increased fluid communication between the first and second scrolls, while adjusting the branch communication valves to a first position may reduce fluid communication between the first and second scrolls, as shown in FIGS. 3A and 3B. Thus, an amount of fluidic communication and conveyance between the first scroll and the second scroll may be adjusted based on engine operating conditions, as shown below in reference to FIG. 4. Example valve adjustments based on engine operating conditions are shown in FIG. 5.

Turning now to FIG. 1, a schematic diagram of an engine 10, which may be included in a propulsion system of a vehicle, is shown. Engine 10 may be controlled at least partially by a control system including controller 12 and by input from a vehicle operator 14 via an input device 16. Controller 12 may be a microcomputer, including a microprocessor unit, input/output ports, an electronic storage medium for executable programs and calibration values, random access memory, keep alive memory, and a data bus. As depicted, controller 12 may receive input from a plurality of sensors (not shown), which may include user inputs and/or sensors (such as transmission gear position, gas pedal input, exhaust manifold temperature, air-fuel ratio, vehicle speed, engine speed, mass airflow through the engine, boost pressure, ambient temperature, ambient humidity, intake air temperature, cooling system sensors, and others). The controller may also send a plurality of control signals to various engine actuators (not shown) in order to adjust engine operation based on signals received from the sensors (not shown). In this example, input device 16 includes an accelerator pedal and a pedal position sensor 18 for generating a proportional pedal position signal PP. Engine 10 may be included in a vehicle such as a road vehicle, among other types of vehicles. While the example applications of engine 10 will be described with reference to a vehicle, it should be appreciated that various types of engines and vehicle propulsion systems may be used, including passenger cars, trucks, etc.

Engine 10 may include a plurality of combustion chambers (i.e., cylinders). In the examples shown in FIG. 1, engine 10 may include combustion chambers 20, 22, 24, and 26, arranged in an inline four configuration. It should be understood, however, that though FIG. 1 shows four cylinders, engine 10 may include any number of cylinders. For example, engine 10 may include any suitable number of cylinders, e.g., 2, 3, 4, 5, 6, 8, 10, 12, or more cylinders in any configuration, e.g., V-6, I-6, V-12, opposed 4, etc. Though not shown in FIG. 1, each combustion chamber (i.e. cylinder) of engine 10 may include combustion chamber walls with a piston positioned therein. The pistons may be coupled to a crankshaft so that reciprocating motions of the pistons are translated into rotational motion of the crankshaft. The crankshaft may be coupled to at least one drive wheel of a vehicle via an intermediate transmission system, for example. Further, a starter motor may be coupled to the crankshaft via a flywheel to enable a starting operation of engine 10.

Each combustion chamber may receive intake air from an intake manifold 28 via an air intake passage 30. Intake manifold 28 may be coupled to the combustion chambers via intake ports. For example, in FIG. 1, intake manifold 28 is shown coupled to cylinders 20, 22, 24, and 26 via intake ports 32, 34, 36, and 38, respectively. Each respective intake port may supply air and/or fuel to the respective cylinder for combustion.

Each combustion chamber may exhaust combustion gases via an exhaust port coupled thereto. For example, exhaust ports 40, 42, 44 and 46, are shown in FIG. 1 coupled to cylinders 20, 22, 24, 26, respectively. Each respective exhaust port may direct exhaust combustion gases from a respective cylinder to an exhaust manifold or exhaust passage.

Each cylinder intake port may selectively communicate with the cylinder via an intake valve. For example, cylinders 20, 22, 24, and 26 are shown in FIG. 1 with intake valves 48, 50, 52, and 54, respectively. Likewise, each cylinder exhaust port can selectively communicate with the cylinder via an exhaust valve. For example, cylinders 20, 22, 24, and 26 are shown in FIG. 1 with exhaust valves 56, 58, 60, and 62, respectively. In some examples, each combustion chamber may include two or more intake valves and/or two or more exhaust valves.

Though not shown in FIG. 1, in some examples, each intake valve and exhaust valve may be operated by an intake cam and an exhaust cam, respectively. Alternatively, one or more of the intake and exhaust valves may be operated by an electromechanically controlled valve coil and armature assembly (not shown). The position of an intake cam may be determined by an intake cam sensor (not shown). The position of exhaust cam may be determined by an exhaust cam sensor (not shown).

Intake passage 30 may include a throttle 64 having a throttle plate 66. In one example, a position of throttle plate 66 may be varied by controller 12 via a signal provided to an electric motor or actuator included with throttle 64, a configuration that is commonly referred to as electronic throttle control (ETC). In this manner, throttle 64 may be operated to vary the intake air provided to the combustion chambers. The position of the throttle plate 66 may be provided to controller 12 by throttle position signal TP from a throttle position sensor 68. Intake passage 30 may include a mass air flow sensor 70 and a manifold air pressure sensor 72 for providing respective signals MAF and MAP to controller 12. In some embodiments, MAP and MAF may not both be present, and only one sensor may be used.

In FIG. 1, fuel injectors are shown coupled directly to the combustion chambers for injecting fuel directly therein in proportion to a pulse width of a signal FPW received from controller 12 via an electronic driver, for example. For example, fuel injectors 74, 76, 78, and 80 are shown in FIG. 1 coupled to cylinders 20, 22, 24, and 26, respectively. In this manner, the fuel injectors provide what is known as direct injection of fuel into the combustion chamber. Each respective fuel injector may be mounted in the side of the respective combustion chamber or on the top of the respective combustion chamber, for example. In other examples, one or more fuel injectors may be arranged in the air intake manifold 28 in a configuration that provides what is known as port injection of fuel into the intake ports (e.g., intake ports 32, 34, 36, and 38) upstream of combustion chambers. Though not shown in FIG. 1, fuel injectors may be configured to deliver fuel received via a high pressure fuel pump (not shown) and a fuel rail (not shown). Alternatively, fuel may be delivered by a single stage fuel pump at lower pressure, in which case the timing of the direct fuel injection may be more limited during the compression stroke than if a high pressure fuel system is used. Further, the fuel tank may have a pressure transducer providing a signal to controller 12. In some examples, fuel may be injected directly into each respective combustion chamber (referred to as direct injection). Indirect injection may be used in other examples.

The combustion chambers of engine 10 may be operated in a compression ignition mode, with or without an ignition spark. In some examples, a distributorless ignition system (not shown) may provide an ignition sparks to spark plugs coupled to the combustion chambers in response to controller 12. For example, spark plugs 82, 84, 86, and 88 are shown in FIG. 1 coupled to cylinders 20, 22, 24, and 26, respectively.

As mentioned above, intake passage 30 may communicate with one or more cylinders of engine 10. In some embodiments, one or more of the intake passages may include a boosting device such as a turbocharger 90. Turbocharger 90 may be include a turbine 92 and a compressor 94 coupled on a common shaft 96. The blades of turbine 92 may be caused to rotate about the common shaft 96 as a portion of the exhaust gas stream or flow discharged from engine 10 impinges upon the blades of the turbine. Compressor 94 may be coupled to turbine 92 such that compressor 94 may be actuated when the blades of turbine 92 are caused to rotate. When actuated, compressor 94 may then direct pressurized fresh gas to air intake passage 28 where it may then be directed to engine 10. The speed of the turbine may be inferred from one or more engine operating conditions. In some examples, the rotational speed of the turbine 92 may be measured with a sensor. For example a speed sensor 97 may be coupled with common shaft 96. A signal indicative of the speed may be delivered, for example, to the controller 12.

Engine 10 may employ a dual scroll (or twin scroll or two-pulse) turbocharger system 98 wherein at least two separate exhaust gas entry paths flow into and through turbine 92. A dual scroll turbocharger system may be configured to separate exhaust gas from cylinders whose exhaust gas pulses interfere with each other when supplied to turbine 92. For example, FIG. 1 shows a first scroll 100 and a second scroll 102, wherein each of the first scroll and second scroll may be used to supply separate exhaust flow to turbine 92. The cross-sectional shape of first scroll 100 and second scroll 102 may be of various shapes, including circular, square, rectangular, D-shaped, etc.

Turbine 92 may include at least one wastegate to control an amount of boost provided by said turbine. In a dual scroll system, both scrolls may share a wastegate to control an amount of exhaust gas which passes through turbine 92. For example, in FIG. 1, the first scroll 100 and second scroll 102 include a wastegate 104. Exhaust flow through wastegate 104 may be controlled by a valve, such as a valve 140 discussed below, to regulate the amount of exhaust gas bypassing turbine 92. In one embodiment, an area of an opening of the wastegate 104 may be positioned equally open to each of the scrolls, such that substantially similar amounts of exhaust gas flow may exit each of the scrolls into wastegate 104 during some conditions.

For example, if a four-cylinder engine (e.g., an I4 engine such as shown in FIG. 1) has a firing sequence of 1-3-4-2 (e.g., cylinder 20 followed by cylinder 24 followed by cylinder 26 followed by cylinder 22), then cylinder 20 may be ending its expansion stroke and opening its exhaust valves while cylinder 22 still has its exhaust valves open. In a single-scroll or undivided exhaust manifold 41, the exhaust gas pressure pulse from cylinder 20 may interfere with the ability of cylinder 22 to expel its exhaust gases. However, by using a dual scroll turbocharger system, wherein exhaust ports 40 and 46 from cylinders 20 and 26 are connected to one inlet of the first scroll 100, and exhaust ports 42 and 44 from cylinders 22 and 24 are connected to the second scroll 102, exhaust pulses or gas flow may be separated, and pulse energy driving the turbine may be increased.

Exhaust gases exiting turbine 92 and/or a wastegate via a first wastegate 104 and/or a second wastegate 108 may pass through an emission control device 112. Emission control device 112 can include multiple catalyst bricks, in one example. In another example, multiple emission control devices, each with multiple bricks, can be used. In some examples, emission control device 112 may be a three-way type catalyst. In other examples, emission control device 112 may include one or a plurality of a diesel oxidation catalyst (DOC), selective catalytic reduction catalyst (SCR), and a diesel particulate filter (DPF). After passing through emission control device 112, exhaust gas may be directed to a tailpipe 114.

Engine 10 may include an exhaust gas recirculation (EGR) system 116. EGR system 116 may deliver a portion of exhaust gas exiting engine 10 into the engine air intake passage 30. The EGR system includes an EGR conduit 118 coupled to a conduit or exhaust passage 122, downstream of the turbine 92, and to the intake passage 30. In some examples, EGR conduit 118 may include an EGR valve 120 configured to control an amount of recirculated exhaust gas. As shown in FIG. 1, EGR system 116 is a low pressure EGR system, routing exhaust gas from downstream of the turbine 92 to upstream of the compressor 94. In some examples, an EGR cooler (not shown) may be placed along EGR conduit 118 which may serve to reduce the temperature of the exhaust gas being re-circulated. In another example, a high pressure EGR system may be used in addition to or in place of the low pressure EGR system. As such, the high pressure EGR system may route exhaust gas from one or more of the first scroll 100 and second scroll 102, upstream of the turbine 92, to the intake passage 30, downstream of the compressor 34.

Under some conditions, EGR system 116 may be used to regulate the temperature and or dilution of the air and fuel mixture within the combustion chambers, thus providing a method of controlling the timing of ignition during some combustion modes. Further, during some conditions, a portion of combustion gases may be retained or trapped in the combustion chamber by controlling exhaust valve timing.

In some examples, controller 12 may be a microcomputer, including a microprocessor unit, input/output ports, an electronic storage medium for executable programs and calibration values, random access memory, keep alive memory, and a data bus. As depicted, controller 12 may receive input from a plurality of sensors, which may include user inputs and/or sensors (such as transmission gear position, gas pedal input, exhaust manifold temperature, air-fuel ratio, vehicle speed, engine speed, mass airflow through the engine, ambient temperature, ambient humidity, intake air temperature, cooling system sensors, and others). The controller may also send a plurality of control signals to various engine actuators (not shown) in order to adjust engine operation based on signals received from the sensors (not shown). In this example, input device 16 includes an accelerator pedal and a pedal position sensor 18 for generating a proportional pedal position signal PP. Further, controller 12 is shown in FIG. 1 receiving various signals from sensors coupled to engine 10, in addition to those signals previously discussed, including: engine coolant temperature (ECT) from a temperature sensor 128; an engine position sensor 130, e.g., a Hall effect sensor sensing crankshaft position. Barometric pressure may also be sensed (sensor not shown) for processing by controller 12. In some examples, engine position sensor 130 produces a predetermined number of equally spaced pulses every revolution of the crankshaft from which engine speed (RPM) can be determined. Additionally, various sensors may be employed to determine turbocharger boost pressure. For example, a pressure sensor 132 may be disposed in intake passage 30 downstream of compressor 94 to determine boost pressure.

Additionally, each scroll of the dual scroll turbocharger system 98 may include various sensors for monitoring operating conditions of the dual scroll system. For example, the first scroll 100 may include an exhaust gas sensor 134 and the second scroll 102 may include an exhaust gas sensor 136. Exhaust gas sensors 134 and 136 may be any suitable sensor for providing an indication of exhaust gas air/fuel ratio such as a linear oxygen sensor or UEGO (universal or wide-range exhaust gas oxygen), a two-state oxygen sensor or EGO, a HEGO (heated EGO), a NOx, HC, or CO sensor. In some cases a single sensor may be used to, for example, sense an air/fuel ratio. The single sensor may be used in place of using sensors 134 and 136, and may be positioned, for example, downstream from the turbine in the conduit or exhaust passage 122. In other examples, one or more additional or alternative sensors, such as sensor 137, may be included to sense the air/fuel ratio immediately downstream of a valve assembly (e.g., valve assembly 145 described below), the valve assembly configured to mix exhaust flow downstream of the combustion chambers.

Each scroll may receive exhaust gas from a specific set of cylinder via specific exhaust manifold segments and distinct inlets. Exhaust gases flowing through the first scroll 100 and exhaust gases flowing through the second scroll 102 are separated by a dividing wall 138. As discussed above, separating exhaust gas flow (i.e. exhaust gas pulses) in the first and second scrolls may increase low-end engine torque and reduce a duration to achieve said torque. As a result, during certain conditions such as high engine load, separating the exhaust gas pulses may result in an increase in efficiency of exhaust gas flow delivery to turbine 92. However, during some engine operating conditions, separating exhaust gas pulses may reduce efficiency of exhaust gas delivery to the turbine. For example, during high engine speed, separating exhaust gas pulses as described above may increase backpressure and pumping work due, in part, to a more restrictive and lower scroll volume between the exhaust valve and the turbine compared to a combined, unseparated single turbine inlet scroll. In other words, a volume of exhaust gas exiting the cylinder(s) may raise the pressure more in the aforementioned dual scroll configuration, since the separated first scroll and second scroll may have a relatively smaller volume as compared to a scroll configuration where the scrolls or passages are not separated. In response, engine power output may be reduced.

Increasing fluid communication and conveyance between and/or upstream of the first and second scrolls during certain engine operating conditions, such as high speed and/or high load, may allow increased engine efficiency and power output. Thus, engine 10 may further include a valve assembly 145, wherein the valve assembly 145 may include a first adaptor 150, a second adaptor 152, and/or a branch communication valve 154 (herein referred to as valve 154) coupled between each of the first adaptor 150 and second adaptor 152. The valve assembly 145 may be configured to selectively allow mixing of exhaust from a first set, or branch, of cylinders, or combustion chambers (e.g., cylinders 20 and 26), and a second set, or branch, of cylinders, or combustion chambers (e.g., cylinders 22 and 24) upstream of each of the inlets of the first scroll 100 and second scroll 102. As such, in one embodiment, valve assembly 145 may be arranged downstream of the exhaust manifold 41 having the first set of cylinders (e.g., cylinders 20 and 26), and a second set of cylinders (e.g., cylinders 22 and 24), and upstream of each of the inlets of the first scroll 100 and second scroll 102. In another embodiment, valve assembly 145 may be integrated in the first scroll 100 and the second scroll 102. Of note, the term "valve" as used herein may be understood to mean an obstruction, which may be movable or positionable to control a flow of fluid, and may be understood to mean a movable obstruction, which may be housed in and/or coupled with various components such as a housing or body, etc.

In one embodiment, first adaptor 150 may be operably coupled and in face sharing contact with an outlet of exhaust manifold 41 of engine 10 downstream of the cylinders, as shown in FIG. 1. Said another way, first adaptor 150 may be configured to receive exhaust gas from the first set of cylinders, such as cylinders 20 and 26, and the second set of cylinders, such as cylinders 22 and 24 of exhaust manifold 41.

Similarly, second adaptor 152 may be operably coupled to and in face-sharing contact with an inlet of first scroll 100 and/or an inlet of second scroll 102 of the dual scroll turbocharger system 98. As will be discussed in detail in FIG. 2, a first opening and a second opening of the second adaptor 152 may align with the first scroll 100 and second scroll 102, respectively, of dual scroll turbocharger system 98. In another example, the first opening and second opening of the first adaptor 150 may also align with the first scroll 100 and second scroll 102, respectively, of the dual scroll turbocharger system 98.

In one embodiment, valve 154 may be provided between the first adaptor 150 and second adaptor 152 to selectively allow or enable mixing of the exhaust from the first set of cylinders (e.g., cylinders 20 and 26), and the second set of cylinders (e.g., cylinders 22 and 24), the exhaust to be delivered downstream to each of the inlets of the first scroll 100 and second scroll 102 during certain engine operating conditions. In one embodiment, valve 154 may be configured to rotate independently relative the first adaptor 150 and the second adaptor 152, such that valve 154 may be opened completely, opened partially, and/or closed to each of the first scroll 100 and/or second scroll 102. The position of valve 154 may be varied by controller 12 via signals provided to an actuator 153 included with valve 154. In one example, actuator 153 may be electric actuators (e.g., electric motors). For example, valve 154 may be positionable or adjustable via one or more signals received from controller 12 in a continuous manner through selected positions or ranges, discussed below. In one example, valve 154 may be adjusted via rotations in a continuous manner in one direction (e.g., clockwise). In another example, valve 154 may be adjusted via rotations in more than one direction (e.g., clockwise and counterclockwise). In yet another example, valve 154 may be adjusted via rotations in an intermittent manner, such that the valve 154 may only be moved to pre-determined, or discrete, positions.

Thus, the valve 154 may be adjusted between selected positions. For example, valve 154 may be movable between a first position (e.g., a closed position) and a second position (e.g., an opened position), as shown in reference to FIGS. 2 and 3. As an example, adjusting valve 154 to the first position may reduce fluidic communication and conveyance of exhaust gas between a plurality of cylinders, the exhaust gas to be delivered to the turbine, e.g., turbine 92. In contrast, the second position may provide fluid communication and conveyance of exhaust gas between a plurality of cylinders, thereby allowing mixed exhaust (e.g., exhaust from one or more branches of the exhaust manifold) to flow to each of the first scroll 100 and second scroll 102.

Specifically, in one embodiment, during other vehicle operating conditions such as low load and low engine speed, valve 154 may be closed completely (e.g., in the first position), such that exhaust from each of the first set of cylinders (e.g., cylinders 20 and 26), and the second set of cylinders (e.g., cylinders 22 and 24) may flow in separate and single flow paths to each of the inlets of the first scroll 100 and second scroll 102. In other words, valve 154 may be completely closed such that considerably no exhaust gas from the first set of cylinders (e.g., cylinders 20 and 26), and the second set of cylinders (e.g., cylinders 22 and 24) may communicate and mix via valve assembly 145. As such, substantially all exhaust gas flow from the first set of cylinders and the second set of cylinders may be individually and independently directed to the turbine, such as turbine 92, via the valve assembly 145 and the first scroll 100 and second scroll 102.

In another embodiment, during certain vehicle operating conditions such as high load and high engine speed, valve 154 may be opened completely (e.g., in the first position), such that an amount of exhaust gas from the first set of cylinders (e.g., cylinders 20 and 26) may mix and combine with an amount of exhaust gas from the second set of cylinders (e.g., cylinders 22 and 24). Likewise, an amount of exhaust gas from the second set of cylinders (e.g., cylinders 22 and 23) may mix and combine with an amount of exhaust gas from the first set of cylinders (e.g., cylinders 20 and 26). In other words, a portion of exhaust gas from the first set of cylinders and the second set of cylinders may be mix and combine, and subsequently directed to the turbine, such as turbine 92, via the first scroll 100 and second scroll 102. As a result, turbulence generated from said mixing between exhaust flow paths from a plurality of cylinders of engine 10 may reduce flow restriction within the valve assembly, thereby reducing pumping loss and increasing engine and fuel efficiency during desired engine operating conditions. Further, engine pumping loss may be reduced by reducing pressure loss across the turbine. When the valve is open, all exhaust gas from one or more cylinders may flow through both scrolls, therefore reducing pressure loss due to an increase of cross-section area of flow passage across the turbine.

In yet another embodiment, valve 154 may be opened a metered amount such that exhaust communication in valve assembly 154 may be restricted to a desired amount. In other words, only a portion of the amount of exhaust gas from the first set of cylinders (e.g., cylinders 20 and 26), and the second set of cylinders (e.g., cylinders 22 and 24) upstream of each of the inlets of the first scroll 100 and second scroll 102 during certain engine operating conditions. As such, said portion of the amount of exhaust gas from the first and second set of cylinders that may combine and mix is less than the amount of exhaust gas from the first and second set of cylinders that may mix and combine when valve 154 is completely or fully opened.

As a result, adjustments to a position of valve 154 may control a rotational speed of the turbine 92, as described, and in turn, regulate the speed of compressor 94. Thus, in some embodiments, a valve, such as valve 154, may enable mixing of exhaust received from an exhaust manifold responsive to engine load and engine speed, the exhaust delivered to a first scroll and a second scroll of the dual scroll turbocharger system 98 in engine 10. Increasing fluid communication and conveyance may include allowing exhaust gas from separate branches of the exhaust manifold to mix via valve assembly 145 when valve 154 is in the second and/or third position.

In alternative embodiments, a valve, such as valve 154 may be positioned to provide control of exhaust gas through the first wastegate 104 and/or the second wastegate 108. As such, wastegate control may include allowing at least a portion of exhaust gas from each of first scroll 100 and second scroll 102 to enter first wastegate 104 and/or second wastegate 108, thereby bypassing turbine 92. In other examples, wastegate control may include closing the wastegate to prevent substantially all exhaust gas from the first and second scrolls (and/or additional scroll(s)) from bypassing the turbine. Since the position of valve 154 may control the rotational speed of the turbine, in some examples, a wastegate position may also be responsive to the position of valve 154 (e.g., a metered or prescribed amount, or fully opened or fully closed), as well as to one or more engine operating conditions, such as engine speed, engine load, desired or demanded torque, and/or increasing or decreasing torque.

In other words, a wastegate position may be adjusted based on the position (e.g., amount of opening) of valve 154. For example, an amount of opening of first wastegate 104 and/or second wastegate 108 may be based on the position of valve 154 and torque demanded, as will be discussed in reference to FIG. 5. In one example, the amount of opening of one or more wastegates may be greater when valve 154 is in the second position as compared to the amount of opening of one or more wastegates when valve 154 is in the first position during a condition when torque demand is increasing. In another example, the amount of opening of one or more wastegates may be less when valve 154 is in the first position as compared to the amount of opening of one or more wastegates when valve 154 is in the second position during a condition when torque demand is decreasing.

In yet another example, detection of cylinder imbalance may be based on, in part, by the position of valve 154, or the amount of opening of valve 154, as will be discussed in FIG. 6. For example, in response to a request for detecting a cylinder imbalance, valve 154 may be adjusted to the first position from the second position or third position. Consequently, an air-fuel ratio in each of the first and second scrolls may be measured, and based on said measured air-fuel ratio, one of a fuel injection amount and/or throttle valve may be adjusted. Other arrangements not specifically illustrated may also be possible in accordance with the present disclosure.

Now referring to FIGS. 2A and 2B, example exploded views of the valve assembly 145 comprising first adaptor 150, second adaptor 152, and a branch communication valve, such as valve 154, in a first position or state (FIG. 2A) and a second position or state (FIG. 2B), are shown. Valve assembly 145 may have a central axis 202, such that each of the first adaptor 150, second adaptor 152, and valve 154 share the common central axis 202. In one embodiment, central axis 202 is substantially parallel to a flow of exhaust gas in the first scroll 100 and second scroll 102. As discussed above, a first end 222 of the first adaptor 150 may engage with and couple to an outlet of the exhaust manifold, such as exhaust manifold 41 of engine 10. Similarly, a second end 228 of second adaptor 152 may engage with and couple to an inlet of the first scroll 100 and an inlet of the second scroll 102. Further, each of the first adaptor 150 and second adaptor 152 may be immovable, or stationary, such that only valve 154 may be rotatable relative to each of the first adaptor 150 and second adaptor 152. In other words, each of the first adaptor 150 and second adaptor 152 may immovably fixed to the exhaust manifold and each inlet of the first and second scrolls, respectively.

Valve 154 may be arranged between each of the first adaptor 150 and second adaptor 152 in an airtight but rotatable manner, such that adjustments of valve 154 may be provided during certain engine operating conditions. In particular, valve 154 may rotate in a direction perpendicular to the flow of exhaust gas about central axis 202 between one or more positions, e.g., first position, second position, and/or a third position of valve 154. A first end 230 of valve 154 may be rotatably coupled to a second end 224 of the first adaptor 150, the second end 224 opposite the first end 222 of the first adaptor 150. A second end 232 of valve 154 may be rotatably coupled to a first end 226 of the second adaptor 152, the first end 226 opposite the second end 228 of the second adaptor 152. In this way, the first adaptor 150 may be configured to receive exhaust gas exiting the exhaust manifold 41 and allow exhaust flow through valve 154 and into turbine 92 via second adaptor 152.

In the example shown in FIGS. 2A and 2B, each of the first adaptor 150 and/or second adaptor 152 may be hollow and have cylindrical shape having an annular cross-section. In another example, each of the first adaptor 150 and/or second adaptor 152 may have another geometric shape, such as a rectangular shape. Further, each of the first adaptor 150 and/or second adaptor 152 may be hollow and include a divider arranged along an inner surface of each of the first adaptor 150 and/or second adaptor 152. In other words, the divider of each of the first adaptor 150 and/or second adaptor 152 may bisect an inner volume of each of the first adaptor 150 and/or second adaptor 152, respectively. For example, first adaptor 150 may include a first divider 210. Similarly, second adaptor 152 may include a second divider 212. Each of the first divider 210 and second divider 212 may be span a diameter along a longitudinal length of their respective adaptors. Said another way, first divider 210 spans a diameter of first adaptor 150 and second divider 212 spans a diameter of the second adaptor 152, such that each of the first divider 210 and second divider 212 crosses an inner volume of first adaptor 150 and second adaptor 152, respectively. In addition, as shown in FIGS. 2A-2B, each of the first divider 210 and second divider 212 may span an entirety of a longitudinal length of each of the first adaptor 150 and second adaptor 152, respectively.

In an alternative example, two or more dividers may be arranged on an inner surface of the first adaptor 150 and/or the second adaptor 152. In another example, the first adaptor 150 may have a single divider, while the second adaptor 152 may have two dividers. It will be appreciated that any number of dividers and combinations of dividers within each adaptor may be provided, if desired. In yet another example, one or more dividers arranged within any adaptor may not span a diameter of the adaptor, but may instead span a length of a chord of the adaptor.

Each divider 210 of first adaptor 150 and divider 212 of second adaptor 152 may form one or more openings within first adaptor 150 and second adaptor 152, respectively. For example, divider 210 of first adaptor 150 may form a first opening 204 and a second opening 214. Similarly, divider 212 of second adaptor 152 may form a first opening 206 and a second opening 216.

In one embodiment, as shown in FIGS. 2A and 2B, an orientation of each divider 210 of first adaptor 150 and divider 212 of second adaptor 152 may be substantially the same when valve assembly 145 is integrated in the dual scroll turbocharger system 98. In other words, each divider 210 and divider 212 may be angled and arranged in a substantially similar fashion with respect to central axis 202 within their respective adaptor, such that first opening 204 of first adaptor 150 aligns with first opening 206 of second adaptor 152, and second opening 214 of adaptor 150 aligns with second opening 216 of adaptor 152.

In one embodiment, first opening 204 and second opening 214 of first adaptor 150 may each substantially align with each outlet of exhaust manifold 41 from one or more sets of cylinders of engine 10, as shown in FIG. 1. Said another way, first opening 204 of first adaptor 150 may receive exhaust gas from the first set of combustion chambers, or cylinders, such as cylinders 20 and 26, and second opening 214 of first adaptor 150 may be arranged to receive exhaust gas from the second set of combustion chambers, or cylinders, such as cylinders 22 and 24.

Likewise, first opening 206 and second opening 216 of second adaptor 152 may each be substantially aligned with an inlet of first scroll 100 and/or an inlet of second scroll 102, respectively, of the dual scroll system 98. As such, first opening 206 and a second opening 216 at the second end 228 of the second adaptor 152 may deliver exhaust flow to the first scroll 100 and second scroll 102, respectively, of dual scroll turbocharger system 98. In one embodiment, the orientations of each of the divider 210 of first adaptor 150 and divider 212 of second adaptor 152 may be substantially stationary or immovable, such that the orientation of each divider may not be adjusted relative to the other divider. In this way, only adjustment(s) to valve 154 may control an amount of mixing of exhaust flow through first adaptor 150 and second adaptor 152 into the first scroll 100 and second scroll 102. However, in alternative embodiments not shown, the first adaptor 150 and/or the second adaptor 152 may be rotatable relative to one another.

As illustrated in FIGS. 2A and 2B, valve 154 may comprise a hollow cylinder. In another example, valve 154 may have another geometric shape. In one embodiment, valve 154 may rotate on central axis 202 substantially perpendicular to a flow of exhaust gas within each of the first scroll 100 and the second scroll 102.

In one embodiment, valve 154 may include a third divider 220 that rotates on central axis 202 substantially perpendicular to the exhaust flow within each of the first and second scrolls. Similar to each of the first adaptor 150 and second adaptor 152, the third divider 220 may span a diameter of valve 154. In addition, as shown in FIGS. 2A-2B, the third divider 220 may span an entirety of a longitudinal length of valve 154. In this way, adjustments to valve 154 may provide selective fluidic communication and conveyance of exhaust gases from the first and second set of cylinders to the first scroll 100 and the second scroll 102. In other embodiments, adjustments to valve 154 may provide selective fluidic communication and conveyance between one or more combinations of first scroll 100, second scroll 102, and/or the first wastegate 104 and/or second wastegate 108 to a point downstream from turbine 92.

In one embodiment, valve 154 may be adjusted and movable in a continuous manner through selected ranges, positions, or states via actuator 153 responsive to one or more signals received from controller 12. For example, valve 154 may be adjusted via rotations about central axis 202 in a continuous manner in a first direction (e.g., counterclockwise). In another example, valve 154 may be adjusted via rotations about central axis 202 in the first direction and an opposite, second direction (e.g., counterclockwise and clockwise). In yet another example, valve 154 may be adjusted via rotations about central axis 202 in an intermittent manner, such that the valve 154 may only be moved to pre-determined, or discrete, positions.

As shown in FIG. 2A, valve assembly 145 is depicted having first adaptor 150, second adaptor 152, and valve 154, wherein the valve 154 is in a first position. Likewise, FIG. 2B illustrates valve assembly 145 having first adaptor 150, second adaptor 152, and valve 154, wherein the valve 154 is in a second position. Valve 154 may rotate in a first direction, shown here as a direction 240, such that an orientation of the third divider 220 may vary between the first position and the second position, and/or any position therebetween. For example, valve 154 may rotate approximately 90 degrees in direction 240 from the first position (FIG. 2A) to the second position (FIG. 2B). As a result, the third divider 220 of valve 154 may concomitantly rotate 90 degrees from the first position to the second position. Each of the first position and second position of valve 154 will be discussed in detail in reference to FIGS. 3A and 3B. It shall be appreciated that when valve 154 is adjusted, first adaptor 150 and/or adaptor 152 may be stationary, such that the first adaptor 150 and/or second adaptor 152 are not rotationally adjusted, and remain immovably coupled to an outlet of the exhaust manifold 41 and each inlet of the first and second scrolls, respectively.

Now turning to FIGS. 2C to 2D, example front views of valve assembly 145 when valve 154 is in the first position (FIG. 2C) and in the second position (FIG. 2D) are shown. For purpose of orientation, the front views of the valve assembly 145 are shown such that the second adaptor 152 is closest to a viewer, followed by the valve 154, and the first adaptor 150 at the opposite end of the second adaptor. Moreover, the front views of the valve assembly 145 are parallel to the central axis 202, such that the flow of exhaust gas would be observed by the viewer moving towards the viewer.

In this example, a front view of valve assembly 145 shown in FIG. 2C illustrates each orientation of the first, second, and third dividers discussed above when valve 154 is in the first position. As shown, the second divider 212 of the second adaptor 152 overlaps with each of the third divider 220 of valve 154 and first divider 210 of first adaptor 150. In this way, only second divider 212 of second adaptor 152 is viewable. In other words, an angle 242 between each of the first divider 210 and second divider 212 relative to third divider 220 of valve 154 is approximately 0 degrees. Thus, valve 154, in the first position, may be completely closed such that considerably no exhaust gas from the first set of cylinders (e.g., cylinders 20 and 26) and the second set of cylinders (e.g., cylinders 22 and 24) may communicate and mix in the dual scroll system 98. In other words, substantially all exhaust gas flow from the first set of cylinders and the second set of cylinders may be separated and independently directed to the turbine, such as turbine 92, via the first scroll 100 and second scroll 102.

Turning to FIG. 2D, the front view of valve assembly 145 shown illustrates each orientation of the first, second, and third dividers discussed above when valve 154 is in the second position, or opened position. In one embodiment, the second divider 212 of the second adaptor 152 overlaps with first divider 210 of first adaptor 150. In contrast to FIG. 2C, the third divider 220 is arranged substantially perpendicular to each of the second divider 212 of the second adaptor 152 and first divider 210 of first adaptor 150. In other words, angle 242 between each of the first divider 210 and second divider 212 relative to third divider 220 of valve 154 is approximately 90 degrees. As such, both second divider 212 of second adaptor 152 and third divider 220 are viewable. Thus, in this example, valve 154 may be opened such that an amount of exhaust gas from the first set of cylinders (e.g., cylinders 20 and 26) and the second set of cylinders (e.g., cylinders 22 and 24) may communicate and mix in the dual scroll system 98.

In this way, exhaust flow through valve assembly 145 via adjustments to valve 154 may be varied based on engine operating conditions, such as engine speed and load, wastegate position, and/or desired boost pressure and torque. For example, during high engine load and/or high engine speed conditions, the position of valve 154 may be adjusted to allow exhaust gas flowing from the first set of cylinders (e.g., cylinders 20 and 26), and the second set of cylinders (e.g., cylinders 22 and 24) to mix and combine. Therefore, engine pumping loss may be reduced by reducing pressure loss across the turbine. When the valve is open, all exhaust gas from one or more cylinders may flow through both scrolls, therefore reducing pressure loss due to an increase of cross-section area of flow passage across the turbine. On the other hand, during low engine load and/or low engine speed conditions, the valve 154 may be adjusted to reduce exhaust gas from the first set of cylinders (e.g., cylinders 20 and 26) and the second set of cylinders (e.g., cylinders 22 and 24) from mixing and combining since increased backpressure and pumping work on the pistons of engine 10 may not be a concern.

Now turning to FIG. 3A, an example exploded illustration of the valve assembly 145 is shown, wherein the valve 154 is in the first position. A first path of exhaust gas flow 312 from the first set of cylinders (e.g., cylinders 20 and 26), and a second path of exhaust gas flow 314 from the second set of cylinders (e.g., cylinders 22 and 24) are shown exiting a first outlet 302 and a second outlet 304, respectively, of exhaust manifold 41. In other words, exhaust gas from the first set of cylinders may exit the first outlet 302 of exhaust manifold 41, and exhaust gas from the second set of cylinders may exit the second outlet 304 of exhaust manifold 41. In one embodiment, when valve 154 is in the first position, the exhaust gas from the first set of cylinders may follow a flow path substantially the same or similar to the first path of exhaust gas flow 312. Similarly when valve 154 is in the first position, the exhaust gas from the second set of cylinders may follow a flow path substantially the same or similar to the first path of exhaust gas flow 314.

The paths of exhaust flow (e.g., first path of exhaust gas flow 312 and/or second path of exhaust gas flow 314) may be at least partially controlled via adjustments valve 154. For example, the first path of exhaust gas flow 312 and/or second path of exhaust gas flow 314 depicted in FIG. 3A may result when valve 154 is adjusted to be closed (e.g., in the first position). Specifically, when valve 154 is in the first position, first opening 204 of first adaptor 150 aligns with first opening 206 of second adaptor 152, and second opening 214 of first adaptor 150 aligns with second opening 216 of second adaptor 152. Further, first opening 208 of valve 154 may also be aligned with each of the first opening 204 of adaptor 150 and first opening 206 of second adaptor 152. Similarly, second opening 218 of valve 154 may also be aligned with each the second opening 214 of first adaptor 150 and the second opening 216 of second adaptor 152. As shown in FIG. 3A, when valve 154 is in the first position, each of the first opening 204 of first adaptor 150, first opening 206 of second adaptor 152, and first opening 208 of valve 154 may be substantially aligned with the first scroll 100. When valve 154 is in the first position, each of the second opening 214 of first adaptor 150, second opening 216 of second adaptor 152, and second opening 218 of valve 154 may be substantially aligned with the second scroll 102.

As such, the first position of valve 154 may substantially allow all exhaust flow from the first set of cylinders (e.g., cylinders 20 and 26) to be substantially contained and passed to the first scroll 100, and pass to turbine 92. Likewise, the first position of valve 154 may substantially allow all exhaust flow from the second set of cylinders (e.g., cylinders 22 and 24) to be substantially contained and passed to the second scroll 102, and pass to turbine 92. In this way, adjusting valve 154 to the first position may reduce fluid communication between exhaust from the branches or sets of cylinders. In alternative embodiments, adjusting valve 154 to the first position may also restrict exhaust flow from the first and second scrolls to the wastegate. Thus, in the first position, valve 154 may direct exhaust flow from the exhaust manifold 41 to turbine 92 in a separate and independent manner.

In one embodiment, the valve 154 may be in the first position, or a position substantially similar to the first position, during a condition when one or more of engine load is less than a threshold load and/or engine speed is less than a threshold engine speed. As an example, the threshold load may be an engine load above which it may be considered a high engine load condition, such as when the vehicle is towing a trailer or hill climbing. In yet another example, the threshold engine speed may be a speed at or above which excessive engine exhaust backpressure may occur in a dual scroll turbocharger system. In other examples, the threshold load and/or threshold engine speed may be based on other engine operating conditions.

Now turning to FIG. 3B, an example second position of valve 154 is shown, wherein valve 154 may be substantially opened to each of the first scroll 100 and second scroll 102. In one embodiment, when valve 154 is in the second position, the exhaust gas from the first set of cylinders may follow a flow path substantially the same or similar to the first path of exhaust gas flow 312. Similarly, the exhaust gas from the second set of cylinders may follow a flow path substantially the same or similar to the first path of exhaust gas flow 314. For example, the first path of exhaust gas flow 312 and/or second path of exhaust gas flow 314 depicted in FIG. 3B may result when valve 154 is adjusted to be opened (e.g., in the second position).

As shown, exhaust gas from the first set of cylinders (e.g., cylinders 20 and 26) may exit first outlet 302 and enter first opening 204 of first adaptor 150, while exhaust gas from the second set of cylinders (e.g., cylinders 22 and 24) may exit second outlet 304 and enter second opening 214 of first adaptor 150 due to an orientation of the first divider 210 of first adaptor 150. Upon exiting first opening 204 of first adaptor 150, the exhaust gas from the first set of cylinder may be diverted, or split, by third divider 220 of valve 154 into each of the first opening 208 and second opening 218 of valve 154 in approximately equal portions since the third divider 220 is shown positioned substantially perpendicular, or at a 90 degrees angle, relative to the orientation of the first divider 210. Similarly, upon exiting second opening 214 of first adaptor 150, the exhaust gas from the second set of cylinder may be diverted, or split, by third divider 220 of valve 154 into each of the first opening 208 of valve 154 and second opening 218 in approximately equal amounts. As such, valve 154 provides an interface or area in which combining and mixing of turbulent exhaust gas in dual scroll turbocharger system 98 may occur in a larger volume as compared to the individual first and second scrolls.

Consequently, upon exiting first opening 208 of valve 154, the exhaust gas from the first set of cylinder may be again divided by second divider 212 into each of the first opening 206 of second adaptor 152, and second opening 216 of second adaptor 152 in approximately equal amounts since the second divider 212 is shown positioned substantially perpendicular, or at a 90 degrees angles, relative to the orientation of the third divider 220. Similarly, upon exiting second opening 218 of valve 154, the exhaust gas from the second set of cylinder may be divided again by second divider 212 into each of the first opening 206 and second opening 216 of second adaptor 152 in approximately equal amounts. As such, the second adaptor 152 may provide an additional an interface or area in which combining and mixing of exhaust gas in dual scroll system 98 may occur in a larger volume as compared to the individual first and second scrolls. In this way, backpressure experienced by the pistons of engine 10 may be reduced, thereby increasing engine efficiency and fuel economy.

The aforementioned paths of exhaust flow (e.g., first path of exhaust gas flow 312 and/or second path of exhaust gas flow 314) may be formed when valve 154 is adjusted to be opened (e.g., in the second position). Specifically, when valve 154 is in the second position, first opening 204 of first adaptor 150 aligns with first opening 206 of second adaptor 152, and second opening 214 of first adaptor 150 aligns with second opening 216 of second adaptor 152. In contrast, first opening 208 of valve 154 may be rotated approximately 90 degrees relative to each of the first opening 204 of adaptor 150 and first opening 206 of second adaptor 152. Similarly, second opening 218 of valve 154 may also be rotated approximately 90 degrees relative to each of the second opening 214 of first adaptor 150 and the second opening 216 of second adaptor 152. As shown in FIG. 3B, when valve 154 is in the second position, each of the first opening 204 of first adaptor 150 and first opening 206 of second adaptor 152, and a portion (e.g., half) of the first opening 208 of valve 154 may be substantially aligned with the first scroll 100. When valve 154 is in the second position, each of the second opening 214 of first adaptor 150 and second opening 216 of second adaptor 152, and a portion (e.g., half) of the second opening 218 of valve 154 may be substantially aligned with the second scroll 102.

In sum, when valve 154 is in the second position, or opened completely, an amount of exhaust gas from the first set of cylinders (e.g., cylinders 20 and 26) may mix with an amount of exhaust gas from the second set of cylinders (e.g., cylinders 22 and 24). Likewise, an amount of exhaust gas from the second set of cylinders (e.g., cylinders 22 and 23) may mix with an amount of exhaust gas from the first set of cylinders (e.g., cylinders 20 and 26). Consequently, valve 154 in the second position may allow considerable mixing of exhaust gas directed via the first scroll 100 and the second scroll 102 to turbine 92 in dual scroll turbocharger system 98.

As discussed above, valve 154 is in the second position may allow exhaust gas flow in the dual scroll system 98 "blow down" into a volume of the valve assembly 145 formed between the first and second adaptors. As discussed, said volume has a larger volume as compared to a volume in each individual scroll when valve 154 is closed (e.g., valve 154 in the first position). In this way, valve 154 in the second position may allow increased exhaust flow communication and conveyance, such that the larger volume in the valve assembly 145 may result in reduced pumping work and exhaust backpressure. Consequently, the second position may increase exhaust gas flow and energy to the turbine to increase boost pressure more rapidly, thereby increasing engine efficiency.

In one example, the valve 154 may be in the second position, or a position substantially similar to the second position, during a condition when engine load is greater than the threshold load and/or engine speed is greater than a threshold speed. In another example, valve 154 may be adjusted to the second position based on other engine operating conditions, such as turbine speed, desired boost pressure, and/or torque demand. As such, valve 154 in the second position may provide an amount of boost pressure to achieve the desired boost pressure while reducing exhaust manifold backpressure during high engine speeds and/or loads.

Additional and/or alternative positions, or states, or ranges are possible in accordance with the present disclosure. For example, valve 154 may be opened a metered amount (herein referred to as a third position), allowing partial mixing and merging of exhaust of the first set of cylinders (e.g., cylinders 20 and 26) to the second set of cylinders (e.g., cylinders 22 and 24) between the first scroll 100 and second scroll 102. Opening valve 154 the metered amount may comprise adjusting valve 154 such that angle 242 between each of the first divider 210 and second divider 212 relative to third divider 220 of valve 154 is between 15 and 75 degrees. In another example, opening valve 154 the metered amount may comprise adjusting valve 154 such that one or more angles formed between each of the first and second divider, and the third divider are acute angles. In this way, as compared to the valve in the second position, valve 154 in the third position may reduce exhaust gas mixing of exhaust from one or more branches of the exhaust manifold, and thus reduce mixing of the exhaust from the first set of cylinders (e.g., cylinders 20 and 26) to the second set of cylinders (e.g., cylinders 22 and 24) since the metered amount of opening of valve 154 may be limited.

In one example, valve 154 may be in the third position, or a position substantially similar to the third position, when one or more of engine load is less than the threshold load, and/or engine speed is less than the threshold engine speed. In another example, the metered amount of opening of valve 154 may be based on engine speed, engine load, wastegate position, and/or demanded torque. As such, in an example, the metered amount of opening of valve 154 may increase as engine load or demanded torque decreases. In another example, the metered amount of opening of valve 154 may increase as engine speed increases. In this way, valve 154 in the third position may enable a desired amount of combining of exhaust gas responsive to one or more engine operating conditions.

Thus, in one embodiment, a system having a dual scroll turbocharger may be provided, comprising a first scroll, a second scroll, fluidically separated from the first scroll via a dividing wall, a first adaptor coupled to an outlet of an exhaust manifold, the first adaptor comprising a first hollow cylinder having first divider traversing an interior volume of the first adaptor, a second adaptor coupled to an inlet of the first scroll and an inlet of the second scroll, the second adaptor comprising a second hollow cylinder comprising a second divider traversing an interior volume of the second adaptor, and a valve coupled to and positioned between the first adaptor and the second adaptor to control an amount of mixing of exhaust received from the exhaust manifold, the exhaust delivered to the first scroll and the second scroll of the turbocharger, the valve comprising a third hollow cylinder comprising a third divider traversing an interior volume of the valve.

In one example, the valve may be positionable in a continuous manner through selected positions, the selected positions including: a first position wherein the valve is closed to separate exhaust flow to each of the first scroll and second scroll; a second position wherein the valve is open to enable mixing of exhaust flow to each of the first and second scrolls; and a third position wherein the valve is opened a metered amount to enable partial mixing of exhaust flow to each of the first and second scrolls.

Further, the valve, the first adaptor, and the second adaptor may share a central axis. The valve may rotate about the central axis to selectively vary an orientation of the third divider of the valve relative to an orientation of each of the first divider of the first adaptor and the second divider of the second adaptor, the central axis parallel to a direction of exhaust flow through each of the first scroll and the second scroll.

In another example, the first position may include the third divider of the valve being substantially aligned with the orientation of each of the first divider of the first adaptor and the second divider of the second adaptor, second position may include the third divider of the valve being oriented substantially perpendicular to the orientation of each of the of the first divider of the first adaptor and the second divider of the second adaptor, and the third position may include the third divider of the valve being oriented between 15 to 75 degrees relative to the orientation of each of the first divider of the first adaptor and the second divider of the second adaptor.

In an example, the valve may be adjusted to the first position to decrease mixing of exhaust received from the exhaust manifold when engine speed is less than a speed threshold and engine load is less than a load threshold. Further, the valve may be adjusted to the second position to increase to increase mixing of exhaust received from the exhaust manifold when engine speed is greater than the speed threshold, and engine load is greater than the load threshold. In another example, the valve may be adjusted to the third position from the first position when engine speed and/or engine load are increasing.

Figure 4:
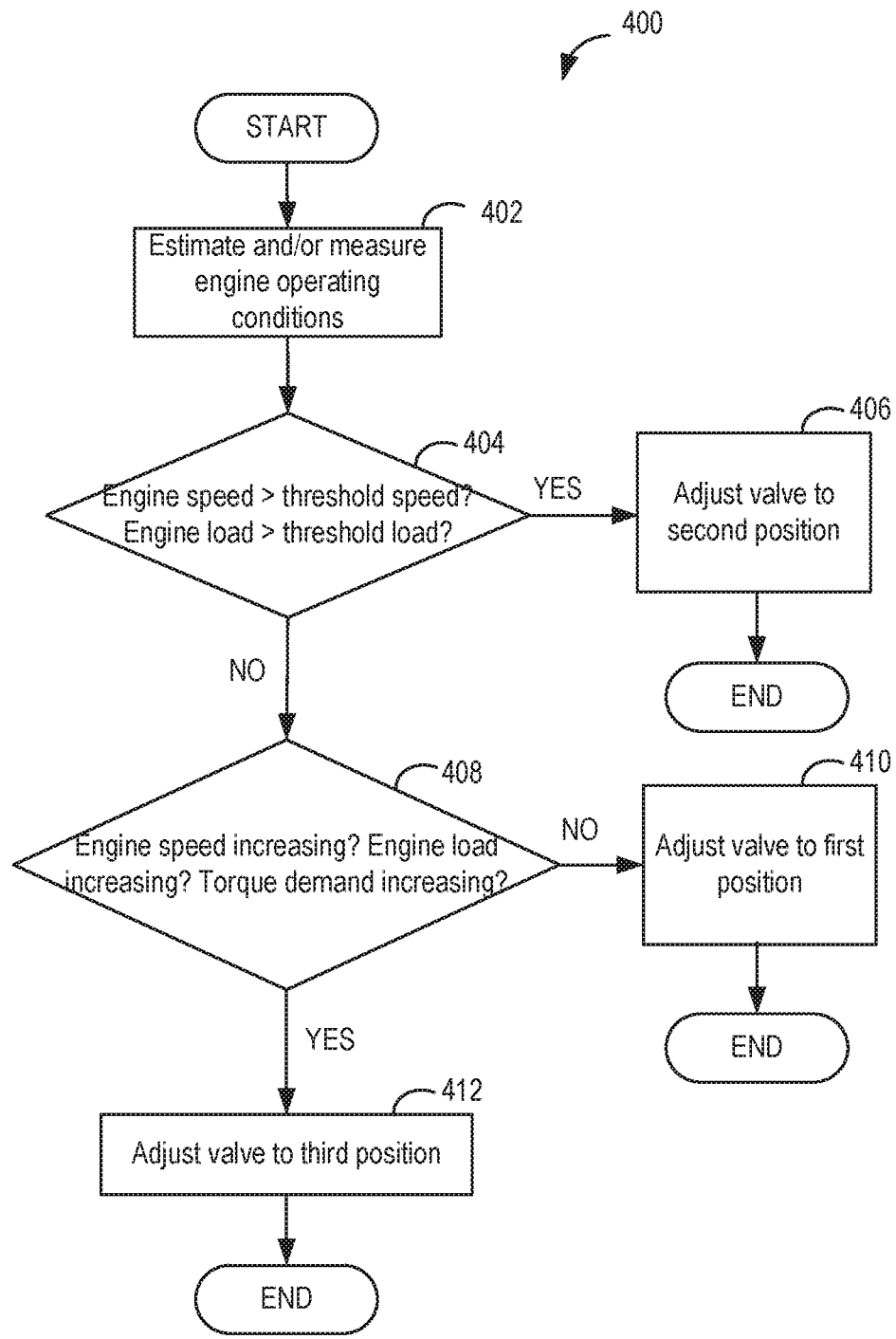
FIG. 4 shows an example method for adjusting an example branch communication valve.
Figure 5:
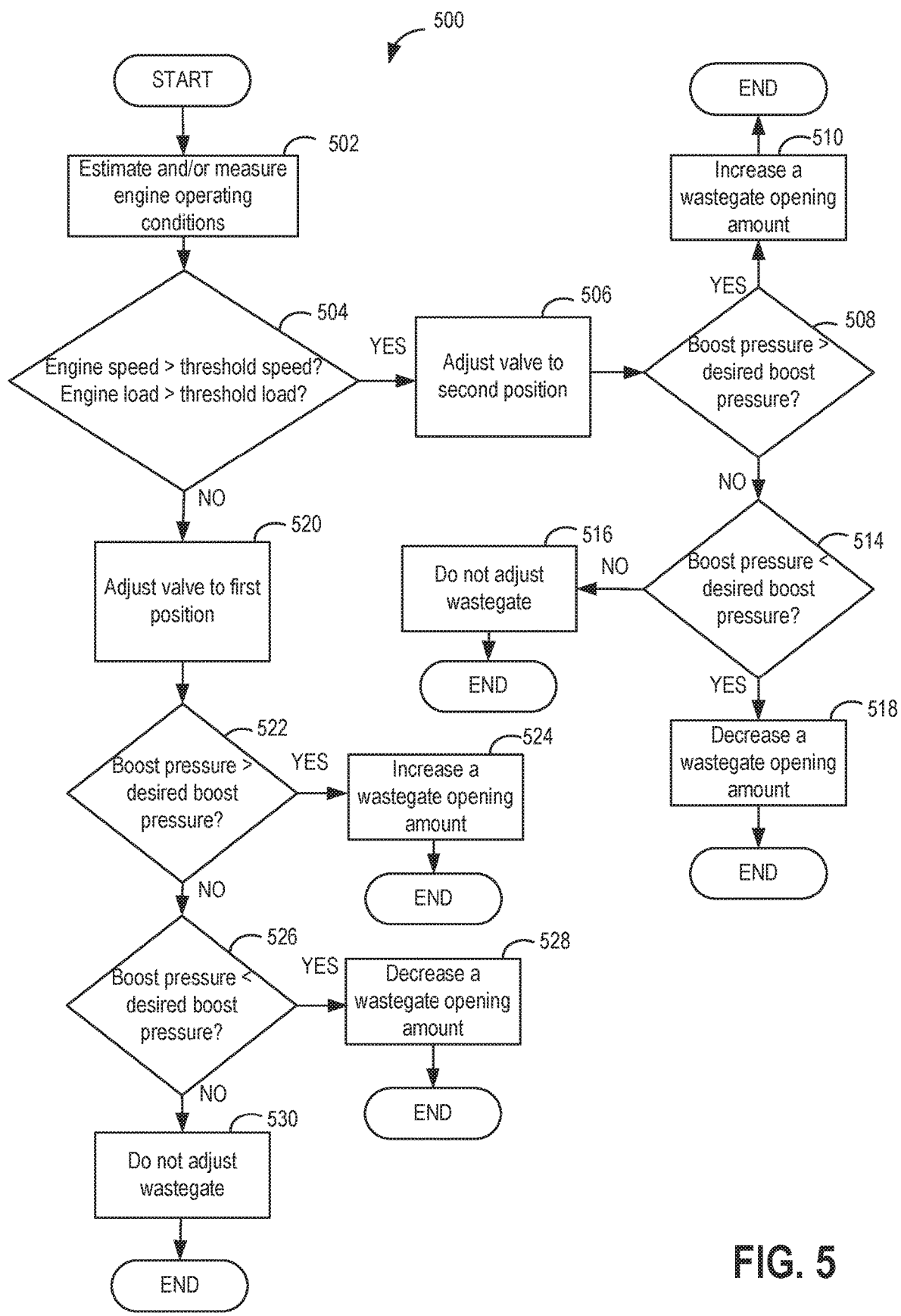
FIG. 5 shows an example method for adjusting an example branch communication valve and wastegate.
Figure 6:
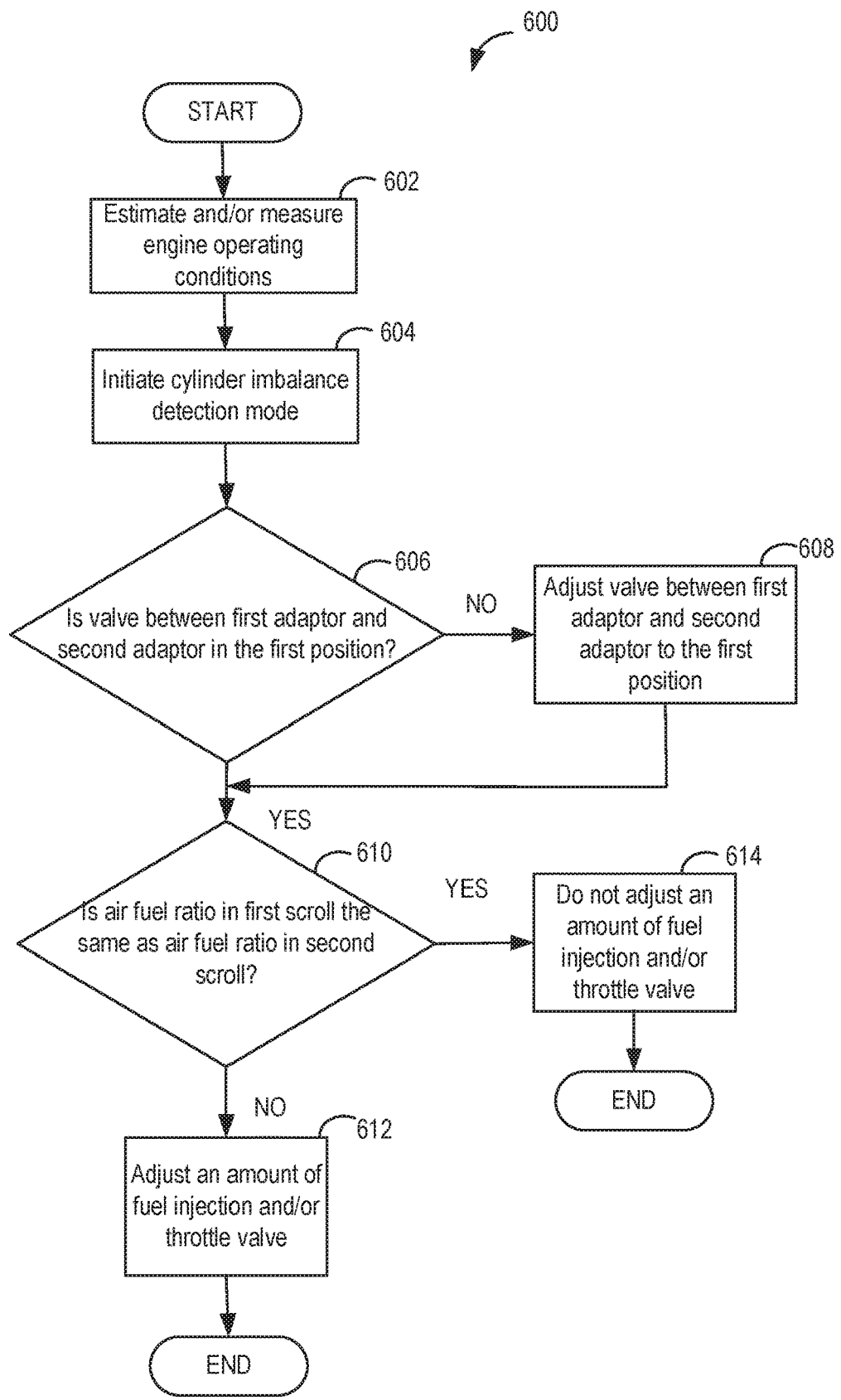
FIG. 6 shows an example method for adjusting an example branch communication valve for detection of cylinder imbalance.

Referring now to FIGS. 4-6, a method, or routine, for adjusting a position of a branch communication valve in response to engine operating conditions, and a method, or routine, for adjusting a wastegate valve based on the position of the branch communication valve are shown. The methods or routines of FIGS. 4-6 may be at least partially incorporated into the system of FIG. 1 as executable instructions stored in non-transitory memory. Further, the methods or routines of FIGS. 4-6 includes actions performed in the physical world. The methods or routines of FIGS. 4-6 may provide the operating sequence shown in FIG. 7. In other words, control methods and routines disclosed herein, as shown in FIGS. 4-6, may be stored as executable instructions in non-transitory memory and may be carried out by the control system including the controller in combination with the various sensors, actuators, and other engine hardware.

FIG. 4 illustrates an example routine 400 for adjusting one or more movable obstructions that are adjustable or positionable, such as valve 154 shown in FIGS. 1-3, to provide multiple positions allowing mixing of exhaust gas from one or more branches of an exhaust manifold, such as first set of cylinders (e.g., cylinders 20 and 26) and a second set of cylinders (e.g., cylinders 22 and 24), to the first turbine inlet scroll (e.g., first scroll 100) and/or the second turbine inlet scroll (e.g., second scroll 102) to a turbine (e.g., turbine 92). Specifically, a position of the valve may be adjusted based on one or more engine operating conditions and/or desired or demanded engine operations. For example, a position of the valve 154 may be responsive to an engine speed and load, and a demanded torque requested by an operator of a vehicle. In alternative examples, the position of valve 154 may be responsive to other engine operating conditions, such as turbine speed, desired and/or measured boost pressure, and/or wastegate position.

At 402, routine 400 estimates and/or measures vehicle operating conditions. Vehicle operating conditions may be determined via receiving output of sensors and actuators in the vehicle system. In one example, vehicle operating conditions include but are not limited to engine temperature, driver demand torque, engine speed, vehicle speed, engine air-fuel ratio, wastegate position, and distance traveled by the vehicle. Routine 400 proceeds to 404 after determining vehicle operating conditions.

At 404, it may be determined if an engine speed is greater than a pre-determined threshold speed and/or an engine load is greater than a pre-determined threshold load. In one example, the threshold load may be an engine load at or above which high engine load may be present, such as during hill-climbing or towing. In other words, the threshold engine load may be a condition above which high engine load (torque) is demanded, engine load determined by various engine operating conditions. In another example, the threshold engine speed may be a speed or range of speeds at which increased backpressure in the exhaust manifold may occur. In yet another example, at 404, it may additionally or alternatively be confirmed if demanded torque is increasing.

If it is confirmed that one of an engine speed is greater than the threshold engine speed and/or the engine load is greater than the threshold engine load at 404, routine 400 continues to 406, where the valve, such as valve 154 is adjusted to the second position, as described in reference to FIGS. 2B and 3B, wherein valve 154 is rotated such that the valve divider, e.g., third divider 220 of valve 154, is arranged substantially perpendicular to each of the dividers of the first adaptor 150 and second adaptor 152. As an example, valve 154 may be rotated 90 degrees counterclockwise from the first position. In this way, if one of an engine load is greater than the threshold load, engine speed is greater than the threshold speed, and/or demanded torque is increasing, routine 400 may adjust the valve to increase an amount of exhaust gas that may be mixed via valve 154 directed to the turbine at 406 in order to reduce risk of backpressure and increased pumping work.

If it is confirmed that one of the engine speed is less than the threshold engine speed and/or the engine load is less than the threshold engine load at 404, routine 400 proceeds to 408. At 408, it may be determined if one or more of an engine speed, engine load, and/or torque demand are increasing. If it is not confirmed that one or more of the engine speed, engine load, and/or torque demand are increasing, then routine 400 proceeds to 410.

At 410, routine 400 may adjust valve 154 to the first position, as described above with reference to FIGS. 2A and 3A. As such, the third divider 220 of valve 154 is substantially aligned with and parallel to each of the first divider 210 of first adaptor 150 and second divider 212 of second adaptor 152. In another example, the valve may be adjusted to a position substantially similar to the first position, such that substantially all exhaust gas flow within each of the first scroll and the second scroll are separately directed to the turbine. In this way, considerably all exhaust gas flow within each of the first and second scroll may drive the turbine in order to provide a desired boost pressure when one of an engine speed is less than the threshold engine speed (e.g., during low engine speed conditions) and an engine load is less than the threshold engine load (e.g., during low engine load conditions).

However, if it is confirmed at 410 that one of an engine speed, engine load, and torque demand are increasing, routine 400 adjusts the valve 154 to the third position at 412, as described above with reference to FIGS. 2 to 3. In one example, valve 154 may be adjusted to a position substantially similar to the third position, such that the valve may be at least partially opened to each of the first and second scrolls to allow a portion of exhaust gas from the first and second set of cylinders to combine and mix. As such, at 412, valve 154 may be positioned between 15 to 75 degrees relative to the orientation of each of the first divider of the first adaptor and the second divider of the second adaptor. In another example, valve 154 may be positioned such that one or more angles formed between each of the first and second dividers, and the third divider are acute angles. Thus, a metered amount of exhaust gas from the first set of cylinders may mix and combine with a metered amount of exhaust gas from the second set of cylinders in valve assembly 145 of dual scroll system 98. In one embodiment, the metered amount of opening of valve 154 may be adjusted based on various engine operating conditions. As an example, the angle 242 between each of the first and second dividers may be adjusted from 15 degrees to 75 degrees relative to the third divider. In one example, the metered amount of opening may increase with increasing engine torque demands and/or engine loads. In another example, the metered amount of opening of valve 154 may increase as engine speed increases. In this way, adjusting valve 154 to the third position may maintain or reduce boost pressure during a low engine speed, a low engine load, and/or low or decreasing demanded torque, for example.

As a result, the valve in the third position, or a position substantially similar to the third position, may allow mixing of a metered amount of exhaust gas from each of the first and second sets of cylinders in the first and second scrolls to drive the turbine, e.g., turbine 92. Thus, the third position of valve 154 may provide an increase in boost pressure to meet an increasing demand for torque. In another example, the third position of valve 154 may provide an increase in boost pressure when one of an engine speed and/or engine load is increasing but still less than their respective thresholds. After one or more adjustments to valve 154 in response to one or more of an engine speed, engine load, and/or demanded torque, routine 400 ends.

Thus, adjusting a branch communication valve, e.g., valve 154 may enable or disable mixing of exhaust received from the exhaust manifold, the exhaust delivered to the first scroll and the second scroll of a turbocharger. In other words, an amount of fluidic communication and conveyance of exhaust gas from each of the first and second set of cylinders may also be adjusted by controller 12 based on various engine operating conditions, such as engine load, engine speed, desired boost, and/or demanded torque. Consequently, an efficiency of the turbine (and turbocharger) and an amount of backpressure in the exhaust manifold may be controlled to achieve desired boost level(s) and engine torque. In other embodiments, adjusting the valve may provide the efficiency of the turbocharger and backpressure to be within predetermined range(s). The efficiency may be determined, for example, by monitoring the intake air pressure, which may be measured, for example, with pressure sensor 132. Other engine sensors and/or sensors not currently described herein, and/or sensors that may not be used in current engine designs may additionally or alternatively be used. For example, an exhaust gas pulse profile may be measured directly and/or determined by one or more sensor readings, or other measures and inferred or calculated by a controller, e.g., controller 12.

Thus, a method for an engine is provided, comprising adjusting a position of a valve arranged between a first adaptor and a second adaptor to enable mixing of exhaust received from an exhaust manifold responsive to engine load and engine speed, the exhaust delivered to a first scroll and a second scroll of a turbocharger, wherein the first adaptor includes a first divider, the second adaptor includes a second divider, and the valve includes a third divider.

In particular, each of the first adaptor and second adaptor may stationary. The first divider of the first adaptor may bisect an inner volume of the first adaptor, the second divider of the second adaptor may bisect an inner volume of the second adaptor, and the third divider of the valve may bisect an inner volume of the valve. In addition, each of the valve, the first adaptor, and the second adaptor may share a central axis, wherein the valve may rotate about the central axis to selectively vary a degree of alignment of the third divider of the valve relative to the first divider of the first adaptor and the second divider of the second adaptor, the central axis parallel to a direction of exhaust flow through each of the first scroll and the second scroll.

In one embodiment, adjusting the position of the valve may enable mixing of exhaust received from the exhaust manifold includes decreasing the degree of alignment of the third divider of the valve relative to the first divider of the first adaptor and the second divider of the second adaptor, and wherein adjusting the valve to enable mixing of exhaust received from an exhaust manifold includes increasing the degree of alignment of the third divider of the valve relative to the first divider of the first adaptor and the second divider of the second adaptor.

In another embodiment, the method may further comprise adjusting the position of the valve to enable mixing of exhaust received from the exhaust manifold when engine speed is greater than a speed threshold and when engine load is greater than a load threshold, and adjusting the position of the valve to disable mixing of exhaust received from an exhaust manifold when engine speed is less than the speed threshold and when engine load is less than a load threshold.

In one example, adjusting the position of the valve to enable mixing of exhaust received from the exhaust manifold may include adjusting the valve to a first position, the first position including the third divider of the valve being substantially aligned with each of the first divider of the first adaptor and the second divider of the second adaptor. In another example, adjusting the position of the valve to enable mixing of exhaust received from the exhaust manifold may include adjusting the valve to a second position, the second position including the third divider of the valve being substantially perpendicular to each of the first divider of the first adaptor and the second divider of the second adaptor.

In yet another example, the method may include adjusting the position of the valve to enable partial mixing of exhaust received from the exhaust manifold, wherein the adjusting the valve to enable partial mixing of exhaust received from the exhaust manifold includes adjusting the position of the valve to a third position, the third position including the third divider of the valve being positioned at an angle between 15 to 75 degrees relative to each of the first divider of the first adaptor and the second divider of the second adaptor.

Further, the method may include increasing the angle between the third divider and each of the first divider of the first adaptor and the second divider of the second adaptor as engine speed and engine load increases, and decreasing the angle between the third divider and each of the first divider of the first adaptor and the second divider of the second adaptor as engine speed and engine load decreases.

In another embodiment, the method may also comprise: in response to a request for detecting cylinder imbalance, adjusting the valve to the first position from the second position or third position, measuring an air-fuel ratio in each of the first scroll and second scroll, and adjusting one of a fuel injection amount and throttle valve based on the air-fuel ratio in each of the first scroll and second scroll. In yet another embodiment, the method may also comprise adjusting a degree of opening of a wastegate based on the position of valve and engine operating conditions.

Now turning to FIG. 5, an example routine 500 is shown for adjusting an amount of opening of one or more wastegates, such as first wastegate 104 and/or second wastegate 108 of FIG. 1, in response to a position of one or more movable obstructions, such as valve 154 shown in FIGS. 1-3. Adjustments to one or more wastegates based on the position of valve 154 may be desirable since engine efficiency may vary depending on the position of the valve 154 and one or more engine operating conditions. For example, a position of a wastegate valve of one or more wastegates (e.g., first wastegate 104 and/or second wastegate 108 of FIG. 1) may be responsive to valve 154 being in the first position and/or second position, as discussed in reference to FIGS. 2-4, as well as to an engine speed and load, and/or a demanded torque requested by an operator of a vehicle. In alternative examples, the position of the wastegate valve may be responsive to other engine operating conditions, such as turbine speed, and desired versus measured boost pressure.

At 502, routine 500 estimates and/or measures vehicle operating conditions. Vehicle operating conditions may be determined via receiving output of sensors and actuators in the vehicle system. In one example, vehicle operating conditions include but are not limited to engine temperature, driver demand torque, engine speed, vehicle speed, engine air-fuel ratio, wastegate position, and distance traveled by the vehicle. Routine 500 proceeds to 504 after determining vehicle operating conditions.

At 504, it may be determined if an engine speed is above a pre-determined threshold speed and/or an engine load is above a pre-determined threshold load. In one example, the threshold load may be an engine load at or above which high engine load may be present, such as during hill-climbing or towing. In other words, the threshold engine load may be a condition above which high engine load (torque) is demanded, wherein the high engine load may be based on various engine operating conditions. In another example, the threshold engine speed may be a speed or range of speeds at which increased backpressure in the exhaust manifold may occur.

If it is confirmed that the engine speed is greater than the threshold engine speed and/or the engine load is greater than the threshold engine load at 504, the routine continues to 506, where the valve, such as valve 154 is adjusted to the second position, as described in reference to FIGS. 2B and 3B. In the second position, the valve 154 is rotated such that the valve divider, e.g., third divider 220 of valve 154, is arranged substantially perpendicular to each of the dividers of the first adaptor 150 and second adaptor 152.

Further, in an alternative embodiment, the wastegate may be commanded to be completely opened in response to the valve being in the second position. In this way, if one of an engine load is greater than the threshold load and engine speed is greater than the threshold speed, routine 500 may completely open the wastegate to increase an amount of exhaust gas that may be diverted from the turbine at 506, while increasing mixing of exhaust gas via valve 154 in order to reduce risk of backpressure and increased pumping work. Routine 500 then proceeds to 508.

At 508, routine 500 determines if a measured boost pressure is greater than a desired boost pressure. In one example, the desired boost pressure may be a boost pressure responsive to varying engine speed and/or engine load. For example, the desired boost pressure may increase with increasing engine speed and/or engine load. In another example, the desired boost pressure may decrease with decreasing engine speed and/or engine load.

If the boost pressure is confirmed to be greater than the desired boost pressure, then a wastegate opening amount is increased at 510. As a result, a greater amount of exhaust may bypass the turbine through the wastegate (e.g., first wastegate 104 and/or second wastegate 108) generated by the vehicle to reduce the boost pressure to the desired boost pressure. Thus, a controller, e.g., controller 12, may adjust the wastegate responsive to a position of valve 154 and desired versus measured boost pressure. In this way, there may be a reduced risk of excessive thermal wear to the dual scroll turbocharger system 98. Routine 500 may then end.

However, if it is confirmed at 508 that boost pressure is not greater than the desired threshold, then routine 500 determines if the boost pressure is less than the desired boost pressure at 514. If the boost pressure is less than the desired boost pressure at 514, then a wastegate opening amount is decreased at 518. As a result, a reduced amount of exhaust may bypass the turbine through the wastegate (e.g., first wastegate 104 and/or second wastegate 108) to increase the boost pressure generated by the vehicle to the desired boost pressure. In this way, a controller, e.g., controller 12, may adjust the wastegate responsive to a position of valve 154 and desired versus measured boost pressure. Routine 500 may then end.

If at 514, routine 500 does not confirm that boost pressure is less than the desired boost pressure, then routine 500 does not adjust wastegate at 516. Routine 500 may then end.

If it is confirmed that the engine speed is less than the threshold engine speed and/or the engine load is less than the threshold engine load at 504, the routine continues to 520, where the valve, such as valve 154 is adjusted to the first position, as described in reference to FIGS. 2A and 3A. In the first position, valve 154 is rotated such that the valve divider, e.g., third divider 220 of valve 154, is arranged substantially aligned to each of the dividers of the first adaptor 150 and second adaptor 152. In another example, the valve may be adjusted to a position substantially similar to the first position, such that substantially all exhaust gas flow within each of the first scroll and the second scroll are separately directed to the turbine since excessive backpressure may not be a concern.

Further, in an alternative example, the wastegate may be commanded to be partially closed in response to the valve being in the first position. In this way, considerably all exhaust gas flow within each of the first and second scroll may drive the turbine in order to provide a desired boost pressure when one of an engine speed is less than the threshold engine speed (e.g., during low engine speed conditions) and an engine load is less than the threshold engine load (e.g., during low engine load conditions). Thus, if one of an engine load is less than the threshold load and engine speed is less than the threshold speed, routine 500 may adjust the valve to reduce an amount of exhaust gas that may be mixed via valve 154 directed to the turbine at 514. Routine 500 then proceeds to 516.

At 522, routine 500 determines if a measured boost pressure is greater than a desired boost pressure. In one example, the desired threshold may be a boost pressure responsive to varying engine speed and/or engine load. For example, the desired boost pressure may increase with increasing engine speed and/or engine load. In another example, the desired boost pressure may decrease with decreasing engine speed and/or engine load.

If the measured boost pressure is confirmed to be greater than the desired boost pressure, then a wastegate opening amount is increased at 524. As a result, a greater amount of exhaust may bypass the turbine through the wastegate (e.g., first wastegate 104 and/or second wastegate 108) generated by the vehicle to reduce the boost pressure to the desired boost pressure. Thus, a controller, e.g., controller 12, may adjust the wastegate responsive to a position of valve 154 and desired versus measured boost pressure. In this way, there may be a reduced risk of excessive thermal wear to the dual scroll turbocharger system 98. Routine 500 may then end.

However, if it is confirmed at 522 that boost pressure is not greater than the desired, then routine 500 determines if the boost pressure is less than the desired boost pressure at 526. If the boost pressure is less than the desired boost pressure at 526, then a wastegate opening amount is decreased at 528. As a result, a reduced amount of exhaust may bypass the turbine through the wastegate (e.g., first wastegate 104 and/or second wastegate 108) to increase the boost pressure generated by the vehicle to the desired boost pressure threshold. In this way, a controller, e.g., controller 12, may adjust the wastegate responsive to a position of valve 154 and desired versus measured boost pressure in order to meet the desired boost pressure demands. Routine 500 may then end.

If at 526, routine 500 does not confirm that boost pressure is less than the desired threshold, then routine 500 does not adjust wastegate at 530. Routine 500 may then end.

Thus, one or more wastegates may be adjusted based on a position of a branch communication valve, e.g., valve 154, and various engine operating conditions, such as engine load, engine speed, desired boost, and/or demanded torque. Consequently, an efficiency of the turbine (and turbocharger) may be controlled to achieve desired boost level(s) and engine torque. In this way, adjusting one or more wastegates may provide the efficiency of the turbocharger and back-pressure to be within predetermined range(s).

Now turning to FIG. 6, an example routine 600 is shown for adjusting a valve, such as valve 154, to the first position from the second position or third position, measuring an air-fuel ratio in each of the first and second scrolls, and adjusting one of a fuel injection amount and throttle valve based on the air-fuel ratio in each of the first and second scrolls in response to a request for detection of a cylinder imbalance. Adjustments to valve 154 after a request for detection of a cylinder imbalance may be desirable when the valve is the in the second and/or third position. For example, when valve 154 is in the second position, exhaust gas from each of the first set of cylinders (e.g., cylinders 20 and 26) and second set of cylinders (e.g., cylinders 22 and 24) may mix and combine, thereby masking detection of variations in cylinder exhaust output. Thus, adjustments to valve 154 may be desirable in order to sense cylinder imbalance.

At 602, routine 600 estimates and/or measures vehicle operating conditions. Vehicle operating conditions may be determined via receiving output of sensors and actuators in the vehicle system. In one example, vehicle operating conditions include but are not limited to engine temperature, driver demand torque, engine speed, vehicle speed, engine air-fuel ratio, wastegate position, and distance traveled by the vehicle. Routine 600 proceeds to 604 after determining vehicle operating conditions.

At 604, a request for a cylinder imbalance monitoring may be initiated. In one example, the request for the cylinder imbalance detection mode may be based on the vehicle operating conditions, such as an air-fuel ratio via one or more sensors, e.g., exhaust gas sensors 134 and 136.

Proceeding from 604, at 606, it is confirmed if the valve, e.g., valve 154 arranged between the first and second adaptor as discussed in reference to FIGS. 1-3, is in the first position. For example, valve 154 may be in the second and/or third position. As such, in order to detect and/or monitor cylinder imbalance, exhaust gas from each of the branches of the exhaust manifold, e.g., first set of cylinders (e.g., cylinders 20 and 26) and second set of cylinders (e.g., cylinders 22 and 24), may be separated in order to reduce mixing of exhaust gas in the first scroll 100 and second scroll 102.

Thus, at 608, if valve 154 is not confirmed to be in the first position (e.g., in the second or third position, as described in reference to FIGS. 1-3), valve 154 is adjusted to the first position. In other words, if valve 154 is in the second position, for example, such that third divider 220 of valve 154 is substantially perpendicular to each of the first and second divider, valve 154 is rotated in a continuous manner so that the first, second, and third dividers are each aligned with one another. In one example, valve 154 may be rotated a first direction, such as direction 240 as discussed in reference to FIG. 3A, or a second direction, the second direction opposite the first direction. In this way, valve 154 may be adjusted to reduce any fluidic communication and conveyance between the first scroll 100 and second scroll 102 in order to monitor cylinder imbalance. Routine 600 then proceeds to 610.

If it is confirmed that valve 154 is in the first position at 606, routine 600 proceeds to 610. At 610, routine 600 determines if an air-fuel ratio in the first scroll 100 is substantially the same as an air-fuel ratio in the second scroll 102. Said determination may include detecting and/or receiving a signal from the exhaust oxygen sensors. In one embodiment, the determination of an air-fuel ratio in each of the first and second scrolls may include measurements by one or more exhaust gas sensors, e.g., exhaust gas sensors 134 and 136. As such, in one example, said determination at 610 may include routing exhaust gas from a group of cylinders to a desired exhaust gas sensor and/or routing exhaust gas from only a sub-set of the engine cylinders to the desired exhaust sensor. Further, the signal detected for each of the exhaust gas sensors may include a response of the exhaust gas sensor at or above a selected frequency. The detected signal may reflect air/fuel ratio of individual cylinders of the engine cylinder bank as the individual cylinders of that bank fire consecutively, and may be related to cylinder-to-cylinder air/fuel ratio dispersion of the cylinders in the engine cylinder bank.

If it is determined at 610 that the an air-fuel ratio in the first scroll 100 is not substantially the same, or within an acceptable range, as an air-fuel ratio in the second scroll 102, then routine 600 may adjust one or more fuel injection amount, ignition timing, and/or throttle valve at 612 to compensate and/or correct for a detected cylinder imbalance. In other examples, additional or alternative adjustments to vehicle operating conditions may be provided.

However, if it is confirmed that the an air-fuel ratio in the first scroll 100 is substantially the same, or within an acceptable range, as an air-fuel ratio in the second scroll 102, routine 600 proceeds to 614, wherein no adjustments to one or more fuel injection amount, ignition timing, and/or throttle valve may be performed. Routine 600 may then terminate.

In this way, adjustments to valve 154 after a request for detection of a cylinder imbalance may be desirable when the valve is the in the second and/or third position in order reduce exhaust gas from each of the first set of cylinders (e.g., cylinders 20 and 26) and second set of cylinders (e.g., cylinders 22 and 24) to mix and blend, masking recognition of cylinder imbalance by the controller. As a result, reliable and effective detection and monitoring of cylinder imbalance may be achieved.

Figure 7:
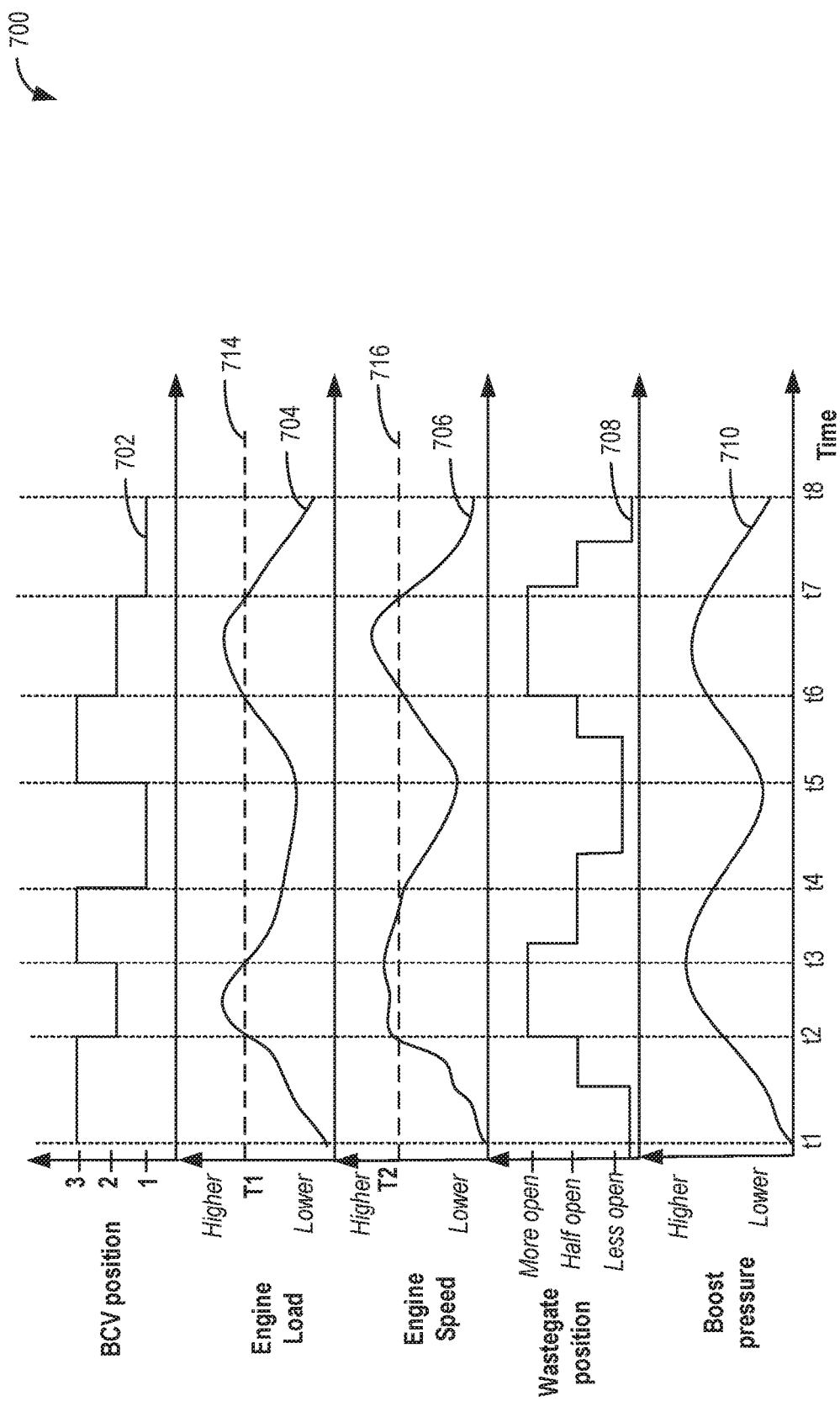
FIG. 7 shows an example operation plot for adjusting an example branch communication valve responsive to engine operating conditions.

FIG. 7 includes graph 700 illustrating example adjustments to a position of a valve in response to engine operating conditions, including one of an engine load, engine speed, and wastegate position. Specifically, graph 700 shows adjustments to valve position at plot 702, changes in engine load at plot 704, changes in engine speed at plot 706, changes in wastegate position at plot 708 and changes in boost pressure at plot 710. The valve discussed in FIG. 7 may be a branch communication valve, as described above with reference to FIGS. 1-6. For example, the valve of FIG. 7 may be valve 154 depicted in FIGS. 2 and 3. Further, a position of the valve in this example may be one of the first position (denoted by "1"), second position (denoted by "2"), and third position (denoted by "3"), as discussed above in reference to FIGS. 2 and 3. In addition, a wastegate in this example may be one of a first wastegate 104 and second wastegate 108 described in reference to FIGS. 1 and 6. Time is plotted along the x-axis, and time increases from the left of the x-axis to the right. Further, a threshold engine load (e.g., T1) is represented by line 714 and a threshold engine speed (e.g., T2) is shown by line 716.

Prior to time t1, the engine is off such that no combustion is occurring. At time t1, the engine is activated and may begin combusting. Between time t1 and time t2, the vehicle may be traveling along a road with a slight incline. Therefore, the engine load is gradually increasing, but remains below the threshold engine load T1 (e.g., line 714). Similarly, engine speed is steadily increasing, but still remains below the threshold engine speed T2 (e.g., line 716).

In response to the aforementioned engine operating conditions, the valve may be adjusted to the third position (or a position substantially similar to the third position) at time t1 and maintained in the third position between time t1 and time t2. For example, in the third position, the valve may be opened a metered amount such that an amount of exhaust gas from each of the branches of the exhaust manifold may interact to create turbulence upstream of the inlets of the first and second scrolls of the turbocharger. Further, engine pumping loss may be reduced by reducing pressure loss across the turbine. When the valve is open, all exhaust gas from one or more cylinders may flow through both scrolls, therefore reducing pressure loss due to an increase of cross-section area of flow passage across the turbine. Thus, a metered amount of exhaust gas from a first set of cylinders and a second, separate set of cylinders may mix and combine via valve 154 since both engine speed and engine load are increasing. Further, between time t1 and time t2, the wastegate may open, in a stepwise manner, from less open to more open to allow a portion of exhaust to bypass the turbine and exit through the wastegate.

At time t2, the vehicle may be traveling on a steeper incline road. As such, the engine load meets and then exceeds the threshold engine load, T1, above which the vehicle operator demands increased boost pressure and/or torque at time t2. Similarly, the engine speed reaches and then exceeds the threshold engine speed, T2. As discussed above, the threshold engine speed may be a speed at or above which excessive engine exhaust backpressure may occur in a dual scroll turbocharger system. The vehicle continues to hill climb between time t2 and time t3, and both engine speed and engine load are above their respective thresholds, T1 and T2. Thus, the valve may be adjusted to the second position, or a position substantially similar to the second position, wherein the valve is opened to each of the first and second scrolls. In this way, between time t2 and time t3, a portion of exhaust gas from each of the branches of the exhaust manifold may interact to create turbulence upstream of the inlets of the first and second scrolls of the turbocharger. Further, engine pumping loss may be reduced by reducing pressure loss across the turbine. When the valve is open, all exhaust gas from one or more cylinders may flow through both scrolls, therefore reducing pressure loss due to an increase of cross-section area of flow passage across the turbine. In this way, there may be a reduction in backpressure and pumping work while increasing an amount of exhaust gas to the turbine to increase measured boost pressure to meet the desired boost pressure. Therefore, the wastegate is adjusted to a more open position in order to route a substantial portion of the exhaust to the wastegate.

At time t3, the vehicle is not hill climbing, but instead, is traveling on a road having less incline. In other examples, the vehicle may be moving downhill. In the aforementioned examples, the engine load decreases below the threshold engine load. However, engine speed is still above the threshold engine speed. Consequently, the boost pressure decreases in response to declining engine load, and the valve is adjusted to the third position, or a position substantially similar to the third position, between time t3 and time t4. In the third position, the valve is opened a metered amount, such that the divider of the valve may be angled at 75 degrees relative to the dividers of the first and second adaptor. As a result, an amount of exhaust gas mixes and combines to reduce risk of backpressure due to a higher engine speed, but to a lesser degree than in the second position. Between time t3 and time t4, the wastegate is adjusted to the half open position since engine load is decreasing. In other examples, the valve may move to the first position between time t3 and time t4.

At time t4, the vehicle continues moving downhill or on a road with little incline, and the engine speed decreases below the threshold engine speed, T2. Further, the engine load continues to steadily decrease, thereby reducing desired boost pressure between time t4 and time t5. In this example, the desired boost pressure and measured boost pressure is substantially the same between time t4 and time t5. Since engine load and boost pressure are not increasing, the valve is adjusted to the first position to decrease an amount of exhaust flow mixing, wherein the valve, e.g., valve 154, is closed to each of the first and second scrolls. Thus, boost pressure concomitantly decreases. Moreover, between time t4 and time t5, the wastegate is in the more closed position to direct a portion of exhaust gas towards the turbine.

At time t5, the vehicle again begins to travel uphill, for example. In another example, the vehicle may be towing a trailer. As shown in this example, each of the engine speed and engine load is increasing, but has not yet reached the threshold engine speed and threshold engine load, respectively. Because the measured engine load has not met the threshold engine load, and the measured engine speed has not met the threshold engine speed, the valve is adjusted to the third position, or a position substantially similar to the third position. As discussed, in the third position, the valve is opened a metered amount, such that the divider of the valve may be angled at 75 degrees relative to the dividers of the first and second adaptor, in one example. As a result, an amount of exhaust gas may mix and combine to reduce risk of backpressure due to an increasing engine speed. Boost pressure concomitantly increases. Moreover, the wastegate may be adjusted to the half open position in order to route a portion of the exhaust to the turbine between time t5 and time t6. In this way, the third position allows an amount of exhaust flow to drive the turbine to meet an increasing torque demand.

At time t6, the engine load and engine speed both reach and/or exceed the threshold engine load, T1, and threshold engine speed, T2, in this example. In response to each of the engine load exceeding the threshold engine load and the engine speed exceeding than the threshold engine speed, the valve may be adjusted to the second position, or a position substantially similar to the second position, to allow mixing of exhaust gas from the first and second set of cylinders, and direct substantially all exhaust gas flow within the first and second scrolls to the turbine, thereby increasing torque and boost pressure. As such, boost pressure concomitantly increases. Further, the wastegate is in the more open position to increase escape of exhaust gas through the wastegate between times t6 and t7. In this way, there may be a reduction in backpressure and pumping work while driving a desired amount of exhaust to the turbine responsive to high engine loads and engine speeds.

At time t7, the vehicle begins traveling on a road having little to no incline, such that engine load and engine speed each fall below the threshold engine load, T1, and threshold engine speed, T2. In response to each of the decreasing engine load and engine speed, the valve is adjusted to the first position. In the first position, the valve is closed completely to each of the first and second scrolls. As such, boost pressure decreases. Moreover, between time t7 and time t8, the wastegate is adjusted to a half open and/or less open position. In this way, an amount of exhaust gas in each of the first and second scrolls may be directed to the turbine. At time t8, a vehicle cycle comprising all events between time t1 and time t8 ends.

The technical effect of adjusting a position of a valve arranged between a first adaptor and a second adaptor to enable mixing of exhaust received from an exhaust manifold is the reduction of backpressure and pumping work in response to varying engine load and engine speed. In particular, engine pumping loss may be reduced by reducing pressure loss across the turbine. When the valve is open, all exhaust gas from one or more cylinders may flow through both scrolls, therefore reducing pressure loss due to an increase of cross-section area of flow passage across the turbine. Thus, there may be increased engine efficiency and fuel economy during desired engine operating conditions. Further, there may be a reduction in cost, weight, and packaging penalties associated with including a simple valve assembly system in the turbocharger and engine system, as compared to installing a branch communication valve having multiple components, such as valve plates, hinges, and recesses. There may also be less burden on an engine control and monitoring system when only a single valve is adjustable by the aforementioned system based on engine operating conditions.

Thus, in one embodiment, an engine system may be provided comprising: a first passage for fluid conveyance from a first branch of combustion chambers to a turbine; a second passage for fluid conveyance from a second branch of combustion chambers to the turbine, and separated from the first passage by a dividing wall; a first adaptor coupled to an outlet of the first branch of combustion chambers and an outlet of the second branch of combustion chambers, the first adaptor having a first divider spanning an inner volume of the first adaptor; a second adaptor coupled to an inlet of the first passage and an inlet of the second passage, the second adaptor having a second divider spanning an inner volume of the second adaptor; and a valve positioned between the first adaptor and the second adaptor for selectively allowing fluid from one of the first and second branches of combustions chambers to another of the first and second branches of combustion chambers, the valve having a third divider spanning an inner volume of the valve.

In one embodiment, the valve may rotate about a central axis to selectively control a position of the valve relative to the first adaptor and the second divider of the second adaptor, the central axis parallel to a direction of exhaust flow through each of the first passages and the second passages. The valve may positionable via a signal received from a controller in a continuous manner through selected ranges including: wherein the valve is in a first position when engine load is less than a threshold engine load and engine speed is less than a threshold engine speed; and wherein the valve is in a second position when engine load is greater than the threshold engine load and engine speed is greater than the threshold engine speed.

In one example, the first position may include the third divider of the valve being aligned with the first divider of the first adaptor and the second divider of the second adaptor, and the second position may include the third divider of the valve being arranged perpendicular to the first divider of the first adaptor and the second divider of the second adaptor.

In another representation, a method for an engine is provided, adjusting a valve to provide one of a separation of exhaust and mixing of exhaust, wherein the valve varies a degree of mixing of exhaust received from an exhaust manifold. Specifically, the valve may vary the degree of mixing by rotating about the central axis to selectively vary a degree of alignment of the third divider of the valve relative to the first divider of the first adaptor and the second divider of the second adaptor, the central axis parallel to a direction of exhaust flow through each of the first scroll and the second scroll.

In one example, the valve may vary the degree of mixing by decreasing the degree of alignment of the third divider of the valve relative to the first divider of the first adaptor and the second divider of the second adaptor, or increasing the degree of alignment of the third divider of the valve relative to the first divider of the first adaptor and the second divider of the second adaptor.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller.

In combination with any of the above methods and systems, adjusting a position of a valve arranged between a first adaptor and a second adaptor to enable mixing of exhaust received from an exhaust manifold responsive to engine load and engine speed, the exhaust delivered to a first scroll and a second scroll of a turbocharger, wherein the first adaptor includes a first divider, the second adaptor includes a second divider, and the valve includes a third divider.

In combination with any of the above methods and systems, each of the first adaptor and second adaptor are stationary, and wherein the first divider of the first adaptor bisects an inner volume of the first adaptor, the second divider of the second adaptor bisects an inner volume of the second adaptor, and the third divider of the valve bisects an inner volume of the valve.

In combination with any of the above methods and systems, each of the valve, the first adaptor, and the second adaptor share a central axis, and wherein the valve rotates about the central axis to selectively vary a degree of alignment of the third divider of the valve relative to the first divider of the first adaptor and the second divider of the second adaptor, the central axis parallel to a direction of exhaust flow through each of the first scroll and the second scroll.

In combination with any of the above methods and systems, adjusting the position of the valve to enable mixing of exhaust received from the exhaust manifold when engine speed is greater than a speed threshold and when engine load is greater than a load threshold, and adjusting the position of the valve to disable mixing of exhaust received from an exhaust manifold when engine speed is less than the speed threshold and when engine load is less than a load threshold.

In combination with any of the above methods and systems, adjusting the position of the valve to enable mixing of exhaust received from the exhaust manifold includes adjusting the valve to a first position, the first position including the third divider of the valve being substantially aligned with each of the first divider of the first adaptor and the second divider of the second adaptor.

In combination with any of the above methods and systems, adjusting the position of the valve to enable partial mixing of exhaust received from the exhaust manifold, wherein the adjusting the valve to enable partial mixing of exhaust received from the exhaust manifold includes adjusting the position of the valve to a third position, the third position including the third divider of the valve being positioned at an angle between 15 to 75 degrees relative to each of the first divider of the first adaptor and the second divider of the second adaptor.

In combination with any of the above methods and systems, increasing the angle between the third divider and each of the first divider of the first adaptor and the second divider of the second adaptor as engine speed and engine load increases, and decreasing the angle between the third divider and each of the first divider of the first adaptor and the second divider of the second adaptor as engine speed and engine load decreases.

In combination with any of the above methods and systems, comprising in response to a request for detecting cylinder imbalance, adjusting the valve to the first position from the second position or third position, measuring an air-fuel ratio in each of the first scroll and second scroll, and adjusting one of a fuel injection amount and throttle valve based on the air-fuel ratio in each of the first scroll and second scroll.

In combination with any of the above methods and systems, further comprising adjusting a degree of opening of a wastegate based on the position of valve and engine operating conditions.

In combination with any of the above methods and systems, adjusting the position of the valve to enable mixing of exhaust received from the exhaust manifold may include decreasing the degree of alignment of the third divider of the valve relative to the first divider of the first adaptor and the second divider of the second adaptor, and wherein adjusting the valve to enable mixing of exhaust received from an exhaust manifold includes increasing the degree of alignment of the third divider of the valve relative to the first divider of the first adaptor and the second divider of the second adaptor.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A system having a dual scroll turbocharger, comprising:
   a first scroll;
   a second scroll, fluidically separated from the first scroll via a dividing wall;
   a first adaptor coupled to an outlet of an exhaust manifold, the first adaptor comprising a first hollow cylinder having a first divider traversing an interior volume of the first adaptor;
   a second adaptor coupled to an inlet of the first scroll and an inlet of the second scroll, the second adaptor comprising a second hollow cylinder comprising a second divider traversing an interior volume of the second adaptor;
   a valve coupled to and positioned between the first adaptor and the second adaptor to control an amount of mixing of exhaust received from the exhaust manifold, the exhaust delivered to the first scroll and the second scroll of the turbocharger, the valve comprising a third hollow cylinder comprising a third divider traversing an interior volume of the valve; and
   a controller with instructions stored in non-transitory memory configured to:
      in response to a request for detecting cylinder imbalance, adjust the valve to a first position from a second position or a third position, measure an air-fuel ratio in each of the first scroll and second scroll, and adjust one of a fuel injection amount and throttle valve based on the air-fuel ratio in each of the first scroll and second scroll.

2. The dual scroll turbocharger system of claim 1, wherein the valve is positionable in a continuous manner through selected positions, the selected positions including:
   the first position, wherein the valve is closed to separate exhaust flow to each of the first scroll and second scroll in the first position;
   the second position, wherein the valve is open to enable mixing of exhaust flow to each of the first and second scrolls in the second position; and
   the third position, wherein the valve is opened a metered amount to enable partial mixing of exhaust flow to each of the first and second scrolls in the third position.

3. The system of claim 2, wherein each of the valve, the first adaptor, and the second adaptor share a central axis, and wherein the valve rotates about the central axis to selectively vary an orientation of the third divider of the valve relative to an orientation of each of the first divider of the first adaptor and the second divider of the second adaptor, the central axis parallel to a direction of exhaust flow through each of the first scroll and the second scroll.

4. The system of claim 3, wherein the first position includes the third divider of the valve being substantially aligned with the orientation of each of the first divider of the first adaptor and the second divider of the second adaptor, wherein the second position further includes the third divider of the valve being oriented substantially perpendicular to the orientation of each of the of the first divider of the first adaptor and the second divider of the second adaptor, and wherein the third position further includes the third divider of the valve being oriented between 15 to 75 degrees relative to the orientation of each of the first divider of the first adaptor and the second divider of the second adaptor.

5. The system of claim 4, wherein the valve is adjusted to the first position to decrease mixing of exhaust received from the exhaust manifold when engine speed is less than a speed threshold and engine load is less than a load threshold, wherein the valve is adjusted to the second position to increase mixing of exhaust received from the exhaust manifold when engine speed is greater than the speed threshold, and engine load is greater than the load threshold, and wherein the valve is adjusted to the third position from the first position when engine speed and/or engine load is increasing.

6. An engine system, comprising:
a first passage for fluid conveyance from a first branch of combustion chambers to a turbine;
a second passage for fluid conveyance from a second branch of combustion chambers to the turbine, and separated from the first passage by a dividing wall;
a first adaptor coupled to an outlet of each of the first branch of combustion chambers and second branch of combustion chambers, the first adaptor having a first divider spanning an inner volume of the first adaptor;
a second adaptor coupled to an inlet of the first passage and an inlet of the second passage, the second adaptor having a second divider spanning an inner volume of the second adaptor;
a valve positioned between the first adaptor and the second adaptor for selectively allowing fluid from one of the first and second branches of combustions chambers to another of the first and second branches of combustion chambers, the valve having a third divider spanning an inner volume of the valve; and
a controller with instructions stored in non-transitory memory configured to:
in response to a request for detecting cylinder imbalance, adjust the valve to a first position from a second position or a third position, measure an air-fuel ratio in each of the first scroll and second scroll, and adjust one of a fuel injection amount and throttle valve based on the air-fuel ratio in each of the first scroll and second scroll.

7. The engine system of claim 6, wherein the valve rotates about a central axis to selectively control a position of the valve relative to the first adaptor and the second adaptor, the central axis parallel to a direction of exhaust flow through each of the first passage and the second passage.

8. The engine system of claim 6, wherein the valve is positionable via a signal received from the controller in a continuous manner through selected ranges including:
the first position when engine load is less than a threshold engine load and engine speed is less than a threshold engine speed; and
the second position when engine load is greater than the threshold engine load and engine speed is greater than the threshold engine speed.

9. The engine system of claim 8, wherein the first position includes the third divider of the valve being aligned with the first divider of the first adaptor and the second divider of the second adaptor, and wherein the second position includes the third divider of the valve being arranged perpendicular to the first divider of the first adaptor and the second divider of the second adaptor.

* * * * *